(12) United States Patent
Otsubo et al.

(10) Patent No.: US 9,365,732 B2
(45) Date of Patent: Jun. 14, 2016

(54) OILY INK COMPOSITION FOR BALLPOINT PENS

(75) Inventors: Aya Otsubo, Tokyo (JP); Yoshitaka Morimoto, Tokyo (JP); Yuichi Kobayashi, Tokyo (JP); Natsumi Koide, Tokyo (JP)

(73) Assignee: PENTEL KABUSHIKI KAISHA (JP)

( * ) Notice: Subject to any disclaimer, the term of this patent is extended or adjusted under 35 U.S.C. 154(b) by 204 days.

(21) Appl. No.: 14/241,003

(22) PCT Filed: Aug. 29, 2012

(86) PCT No.: PCT/JP2012/071866
§ 371 (c)(1),
(2), (4) Date: Jun. 18, 2014

(87) PCT Pub. No.: WO2013/031845
PCT Pub. Date: Mar. 7, 2013

(65) Prior Publication Data
US 2015/0071698 A1    Mar. 12, 2015

(30) Foreign Application Priority Data
Aug. 31, 2011    (JP) .................... 2011-189491

(51) Int. Cl.
| | | |
|---|---|---|
| B43K 7/00 | (2006.01) |
| C09D 11/18 | (2006.01) |
| C09D 101/26 | (2006.01) |
| B43K 7/01 | (2006.01) |
| C08K 3/04 | (2006.01) |
| C09D 101/28 | (2006.01) |

(Continued)

(52) U.S. Cl.
CPC . *C09D 11/18* (2013.01); *B43K 7/01* (2013.01); *C08K 3/04* (2013.01); *C09D 101/26* (2013.01); *C09D 101/28* (2013.01); *C09D 105/00* (2013.01); *C09D 161/02* (2013.01)

(58) Field of Classification Search
CPC ......... C09D 11/18; C09D 101/26; B43K 7/01
See application file for complete search history.

(56) References Cited

U.S. PATENT DOCUMENTS

| 5,314,531 A | 5/1994 | Huber et al. ............... 106/22 |
| 6,406,204 B1 | 6/2002 | Omatsu et al. ............ 401/142 |

(Continued)

FOREIGN PATENT DOCUMENTS

| JP | 5339533 | 12/1993 |
| JP | 2005162794 | 6/2005 |

(Continued)

OTHER PUBLICATIONS

International Search Report mailed Nov. 20, 2012 issued in International Appln. No. PCT/JP2012/071866.
European Search Report issued Apr. 24, 2015 in Appln. No. EP 12 82 7689.

*Primary Examiner* — Jennifer C Chiang
(74) *Attorney, Agent, or Firm* — Adams & Wilks

(57) ABSTRACT

An oil-based ink composition for a ballpoint pen has an ink viscosity at 25° C. is 200,000 mPa·s or more at a shear rate of $0.019\ s^{-1}$ and 5,000 mPa·s or less at a shear rate of $10,000\ s^{-1}$ and a storage modulus at an angular frequency of 0.019 rad/sec is 10 Pa or more. The ink composition ensures a thin-width writing line, without bleeding or feathering, and prevents ink-depleted regions at the central part of the writing line so that the writing line is uniform and clear.

6 Claims, 4 Drawing Sheets

(51) Int. Cl.
*C09D 105/00* (2006.01)
*C09D 161/02* (2006.01)

(56) References Cited

U.S. PATENT DOCUMENTS

| | | | | |
|---|---|---|---|---|
| 7,776,941 B2* | 8/2010 | Yoneda | ............... | C09D 11/16 |
| | | | | 106/31.13 |
| 2003/0086744 A1 | 5/2003 | Omatsu et al. | ............... | 401/141 |
| 2004/0161286 A1 | 8/2004 | Omatsu et al. | ............... | 401/141 |

FOREIGN PATENT DOCUMENTS

| | | |
|---|---|---|
| JP | 2005336481 | 8/2005 |
| JP | 2006089615 | 4/2006 |
| JP | 2007153941 | 6/2007 |
| JP | 2008013585 | 1/2008 |
| JP | 2009030040 | 2/2009 |
| JP | 200962544 | 3/2009 |
| JP | 2011246498 | 12/2011 |

* cited by examiner

OILY INK COMPOSITION FOR BALLPOINT PENS

TECHNICAL FIELD

The present invention relates to an oil-based ink composition for a ballpoint pen. More specifically, the present invention relates to an oil-based ink composition for a ballpoint pen, ensuring that the width of writing line is thin, even slight unevenness or feathering does not occur at the boundary between the writing line and a paper sheet, and clear writing line with no ink depletion is obtained.

BACKGROUND ART

In order to reduce the blur of writing line, attempts have been made to prevent spreading of ink to a paper space absent of writing line from the writing line by adjusting the surface tension of ink or the amount added of a penetrating component and thereby suppressing penetration of ink into paper or by adjusting the rheology of ink and thereby suppressing the flowability of ink on the writing line.

As for the technique to reduce blur of writing line by adjusting the rheology of ink, it is known to suppress the flowability of ink by making the ink viscosity high or increase the storage modulus. Also, when the ink viscosity is made high, flowability in writing line is usually lost to cause ink depletion in the writing line, and therefore, there is known a method for obtaining clear writing line by imparting a shear viscosity reduction to the ink and despite high viscosity during standing still of the ink, reducing the viscosity by a shear force attributable to rotation of a ball during writing, thereby preventing both blur of writing line and occurrence of ink depletion. For example, it is known in Patent Document 1 that in an oil-based ink for a pressurized ballpoint pen, the viscosity is 50,000 mPa·s or more at a shear rate of 0.19 (20° C.) and becomes 30,000 mPa·s or less at a shear rate of 500 $s^{-1}$ (20° C.). Furthermore, Patent Document 2 discloses an oil-based ink composition where the viscosity at a shear rate of 1 $s^{-1}$ is adjusted to from 10,000 to 500,000 mPa·s by adding a shear viscosity reduction-imparting agent.

Patent Document 3 discloses an ink composition where the "thickening" of the line width protruding outside the printing region due to flowing of an electrically conductive ink is eliminated by adjusting the composition to have a storage modulus of 5,000 to 50,000 Pa and tan δ≤1 at a frequency of 1 Hz and a vibration stress of 50 Pa.

On the other hand, in order to reduce the ink depletion in writing line, attempts have been made to uniformly apply ink to the ball surface by adjusting the surface tension of ink or the amount added of a penetrating component and thereby enhancing the wettability of ink to the ball surface or by adjusting the rheology of ink and thereby increasing the flowability of ink on the ball surface. As for the technique to reduce ink depletion in writing line by adjusting the rheology of ink, it is known to increase the flowability of ink by making the ink viscosity low or adjust tan δ of ink. Patent Document 3 also discloses an ink composition where tan δ at 100 rad/s is set to 1.0 or less and the modulus response is thereby maintained even when the ink becomes flowable because of reduction in viscosity due to shear during writing, as a result, the ink hardly splits and is less likely to be pulled aside and in turn, ink depletion in writing line is eliminated.

As for the rheology adjusting agent to impart such rheology characteristics to ink, a higher fatty acid soap, an oil/fat derivative, a silica particle, an acrylic resin, a cellulose derivative and the like are known as a material for imparting a shear viscosity reduction to ink. Among others, in Patent Documents 5, 6 and 7, specific examples using a cellulose derivative are disclosed as a material capable of imparting a large shear viscosity reduction to ink with a small addition amount.

PRIOR ART LITERATURE

Patent Document

Patent Document 1: JP-A-2006-89615
Patent Document 2: JP-A-2005-336481
Patent Document 3: JP-A-2011-246498
Patent Document 4: JP-A-2009-30040
Patent Document 5: JP-A-2007-153941
Patent Document 6: JP-A-5-339533
Patent Document 7: JP-A-2008-13585

SUMMARY OF THE INVENTION

Problems that the Invention is to Solve

However, when the surface tension or the viscosity/storage modulus is increased, an ink having low flowability is formed and the ink may not be uniformly spread on the ball surface or an interruption or ink depletion is likely to occur in the writing line. On the contrary, when the surface tension or viscosity/storage modulus is reduced, an ink having high flowability is formed to readily cause bleeding. When the shear viscosity reduction is imparted to ink to reduce the ink viscosity by a high shear force attributable to rotation of a ball during writing and thereby achieve uniform wetting of the ink on the ball surface, for example, the ink reduced in the viscosity and applied to a paper sheet penetrates along a gap of fibers to cause a problem that the boundary of a written line blurs. Thus, it has been impossible to satisfy both interruption-free or ink depletion-free writing line and blurless writing line by the adjustment of surface tension, viscosity, storage modulus and shear viscosity reduction.

Means for Solving the Problems

That is, the present invention includes, as a first aspect, an oil-based ink composition for a ballpoint pen, wherein at 25° C., the viscosity at a shear rate of 0.019 $s^{-1}$ is 200,000 mPa·s or more, the viscosity at a shear rate of 10,000 $s^{-1}$ is 5,000 mPa·s or less, and the storage modulus at an angular frequency of 0.019 rad/sec is 10 Pa or more; as a second aspect, the oil-based ink composition for a ballpoint pen, wherein at 25° C., tan δ at an angular frequency of 0.019 rad/sec is less than 1.0; as a third aspect, the oil-based ink composition for a ballpoint pen, comprising at least a colorant, one member or a mixture of two or more members selected from a cellulose derivative and/or a mucopolysaccharide, a polyhydric alcohol solvent, and an organic solvent having a solubility parameter (the SP value introduced by Hildebrand, measurement temperature: 20° C., unit: cal/cm³; hereinafter, the unit is omitted) of 8.0 to 9.5; as a fourth aspect, the oil-based ink composition for a ballpoint pen, wherein the colorant contains at least a pigment; as a fifth aspect, the oil-based ink composition for a ballpoint pen, wherein the cellulose derivative is ethyl cellulose; and as a sixth aspect, a pressurized ballpoint pen filled with the oil-based ink composition for a ballpoint pen.

Effect of the Invention

At 25° C., the viscosity at a shear rate of 10,000 $s^{-1}$ corresponding to the shear rate applied to the ink by the rotation of a ball during writing is 5,000 mPa·s or less, so that the ink can have flowability high enough to enable uniform attachment of the ink on a ball and hardly allow occurrence of an interruption or ink depletion in writing line, the storage modulus at 0.019 rad/sec during standing still is 10 Pa or more, so that at the moment of the ink on writing line being released from the shear force by a ball, the ink on writing line can immediately recover a viscosity of 200,000 mPa·s or more (assuming that the shear rate of 0.019 s$^{-1}$ is a state where the shear during writing is released) at which bleeding or wet spreading does not occur and in turn, clear writing line having a thin width of writing line and neither forming even slight unevenness or feathering at the boundary of the writing line and a paper sheet nor involving ink depletion can be obtained.

Also, the value of tan δ at an angular frequency of 0.019 rad/sec assuming the same state as above of being released from the shear during writing is less than 1.0, and the ink on writing line is more predominantly governed by an elastic element developing the behavior as a spring than a viscous element, so that the structure can be apparently maintained by the elastic element without allowing plastic deformation of fracturing the structure and increasing the flowability to occur even under a small stress due to the gravity continuously applied to the ink on writing line until drying of the ink and in turn, the ink can always keep the state of 200,000 mPa·s or more until drying of the writing line. As a result, the ink does not spread any more to a paper space absent of writing line from the writing line portion defined at the moment of transfer and allows for no thickening of the width of writing line, and the ink put on a paper sheet or the like does not move but remains exactly in that form, so that clear writing line kept from occurrence of even slight blur of the writing line due to gravity can be obtained.

In this connection, the above-described numerical value of rheology is a value measured using a rheometer of Viscoanalyzer VAR100 (manufactured by Reologica) at a measurement temperature of 25° C. and using a 1°/φ20 mm cone and plate geometry. With respect to the storage modulus and tan δ, the measurement condition is under a strain control of 1%.

The colorant includes a dye and a pigment. The pigment is in the state of being dispersed as a particle without dissolving in an organic solvent in the ink, and slipping of the pigment itself by the shear force produces a property of shear viscosity reduction, as a result, a larger shear viscosity reduction is imparted. Also, since the pigment is not dissolved in an organic solvent, even when the organic solvent slightly penetrates into the paper sheet from the writing line, movement of a colorant component is blocked by a fiber of the paper sheet. According to a great shear viscosity reduction and blocking of movement of a colorant component, which are brought about by the above-described actions, clear writing line more successfully prevented from blur and ink depletion is obtained.

Furthermore, a cellulose derivative and/or a mucopolysaccharide are very effective in terms of thickening effect or shear viscosity reduction-imparting effect because of their structure having regularly both a hydrophobic skeleton and many hydroxyl groups in as a small unit as one molecule of a polymerization monomer. By using such a cellulose derivative and/or a mucopolysaccharide in combination with a polyhydric alcohol solvent and an organic solvent having a solubility parameter of 8.0 to 9.5, the cellulose derivative and/or mucopolysaccharide can break off entanglement between hydroxyl group moieties crystallized intramolecularly or intermolecularly or between hydrophobic groups and show good dissolution in the state of extending a polymer chain, and great thickening effect, shear viscosity reduction and storage modulus of the cellulose derivative and/or mucopolysaccharide can be imparted to the ink. As a result, a great shear viscosity reduction and a high storage modulus such that at 25° C., the viscosity at a shear rate of 0.019 s$^{-1}$ is 200,000 mPa·s or more, the viscosity at a shear rate of 10,000 s$^{-1}$ is 5,000 mPa·s or less, and the storage modulus at an angular frequency of 0.019 rad/sec is 10 Pa or more, can be realized, and clearer writing line without blur and ink depletion of writing line is obtained. Among others, ethyl cellulose can realize, in a wider range of blending formulations, all of large shear viscosity reduction, high storage modulus, and tan δ of less than 1.0, because of good solubility in an organic solvent and viscoelastic characteristics of the resin itself.

MODE FOR CARRYING OUT THE INVENTION

Figure 1:
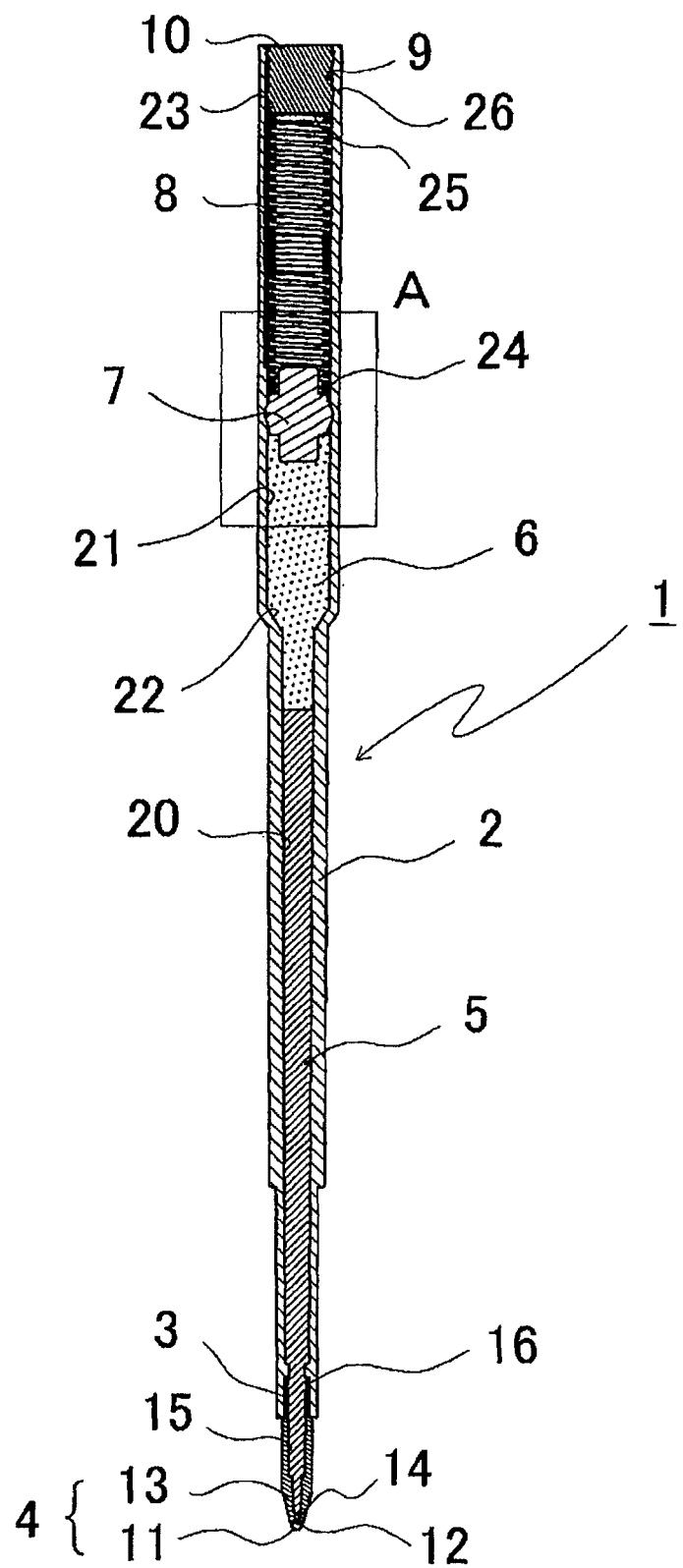
FIG. 1 A longitudinal cross-sectional view showing a working example (the state where the ink composition is not consumed).

The colorant includes a dye and a pigment, and either one may be used, but a pigment is more likely to develop a property of shear viscosity reduction than a dye and can impart a greater shear viscosity reduction with the same amount of solid matters.

In the case of using a pigment as the colorant, conventionally known pigments can be used as the pigment. Examples of the organic pigment include an organic pigment such as Pigment Red 2, Pigment Red 3, Pigment Red 5, Pigment Red 8, Pigment Red 17, Pigment Red 22, Pigment Red 31, Pigment Red 38, Pigment Red 41, Pigment Red 48:1, Pigment Red 48:2, Pigment Red 48:3, Pigment Red 49, Pigment Red 50:1, Pigment Red 53:1, Pigment Red 57:1, Pigment Red 58:2, Pigment Red 60, Pigment Red 63:1, Pigment Red 63:2, Pigment Red 64:1, Pigment Red 88, Pigment Red 112, Pigment Red 122, Pigment Red 123, Pigment Red 144, Pigment Red 146, Pigment Red 149, Pigment Red 166, Pigment Red 168, Pigment Red 170, Pigment Red 176, Pigment Red 177, Pigment Red 178; Pigment Red 179, Pigment Red 180, Pigment Red 185, Pigment Red 190, Pigment Red 194, Pigment Red 202, Pigment Red 206, Pigment Red 207, Pigment Red 209, Pigment Red 211, Pigment Red 213, Pigment Red 216, Pigment Red 245, Pigment Red 254, Pigment Red 255, Pigment Red 264, Pigment Red 270, Pigment Red 272, Pigment Orange 5, Pigment Orange 10, Pigment Orange 13, Pigment Orange 16, Pigment Orange 36, Pigment Orange 40, Pigment Orange 43, Pigment Orange 61, Pigment Orange 64, Pigment Orange 71, Pigment Orange 73, Pigment Violet 19, Pigment Violet 23, Pigment Violet 31, Pigment Violet 33, Pigment Violet 36, Pigment Violet 37, Pigment Violet 38, Pigment Violet 50, Pigment Blue 2, Pigment Blue 9, Pigment Blue 15, Pigment Blue 15:1, Pigment Blue 15:2, Pigment Blue 15:3, Pigment Blue 15:4, Pigment Blue 15:5, Pigment Blue 15:6, Pigment Blue 16, Pigment Blue 17, Pigment Blue 22, Pigment Blue 25, Pigment Blue 28, Pigment Blue 29, Pigment Blue 36, Pigment Blue 60, Pigment Blue 66, Pigment Blue 68, Pigment Blue 76, Pigment Brown 23, Pigment Brown 25, Pigment Brown 26, Pigment Yellow 1, Pigment Yellow 3, Pigment Yellow 12, Pigment Yellow 13, Pigment Yellow 24, Pigment Yellow 83, Pigment Yellow 93, Pigment Yellow 94, Pigment Yellow 95, Pigment Yellow 97, Pigment Yellow 99, Pigment Yellow 108, Pigment Yellow 109, Pigment Yellow 110, Pigment Yellow 117, Pigment Yellow 120, Pigment Yellow 128, Pigment Yellow 139, Pigment Yellow 147, Pigment Yellow 151, Yellow 153, Pigment Yellow 166, Pigment Yellow 167, Pigment Yellow 173, Pigment Green 7, Pigment Green 10, Pigment Green 36, and Pigment Black 7.

The inorganic pigment includes an inorganic pigment, for example, carbon black such as furnace black, channel black, thermal black and acetylene black, black iron oxide, yellow iron oxide, red iron oxide, ultramarine, iron blue, cobalt blue, titanium yellow, turquoise, molybdate orange, and titanium oxide.

As other pigments, a fluorescent pigment, a pearl pigment, a light-storing pigment, a metallic pigment, a composite metallic pigment, a metal oxide pigment and the like may be also used. Examples of the fluorescent pigment include FZ-5000 series (produced by Sinloihi Co., Ltd.). Examples of the pearl pigment include PEARL-GLAZE MRY-100 and PEARL-GLAZE ME-100 (produced by NIHONKOKEN Co., Ltd.), Examples of the light-storing pigment include GSS (produced by Nemoto & Co., Ltd.). The metallic pigment is used for the purpose of radiating a bright feel different from the color of writing line and includes, for example, an aluminum powder, a bronze powder and a zinc powder, and specific examples thereof include, as the commercially available aluminum powder, SUPERFINE No. 22000, SUPERFINE No. 18000, SUPERFINE No. 900 and SUPERFINE No. 800 (all produced by Yamato Metal Powder Co., Ltd.).

One of these pigments may be used or two or more thereof may be mixed and used. The amount of the pigment used is, in the case of using the pigment alone as the colorant, from 10 to 60 wt % based on the total amount of the ink composition. If the amount used is less than 10 wt %, a sufficient writing line density is not obtained due to a small colorant amount, whereas if the amount used exceeds 60 wt %, the amount of solid matters becomes too large and starving occurs in writing line due to thickening with aging.

For increasing the pigment dispersion efficiency, a pigment previously finely dispersed in the above-described polymer compound may be formed into a particle and used. Such a pigment is generally called a processed pigment and since use of the processed pigment facilitates dispersion in a solvent and enables obtaining high dispersion stability, this pigment can be used as an effective means in view of production. Examples of the processed pigment include MICROLITH Yellow 2G-T, MICROLITH Yellow 3R-T, MICROLITH Brown 5R-T, MICROLITH Scarlet R-T, MICROLITH Red BR-T, MICROLITH Blue GS-T, MICROLITH Green G-T, MICROLITH Black C-T (a pigment finely dispersed in a rosin ester resin, produced by BASF, Germany), MICROLITH Yellow 4G-A, MICROLITH Yellow MX-A, MICROLITH Yellow 2R-A, MICROLITH Brown 5R-A, MICROLITH Scarlet R-A, MICROLITH Red 2C-A, MICROLITH Red 3R-A, MICROLITH Magenta 2B-A, MICROLITH Violet B-A, MICROLITH Blue 4G-A, MICROLITH Green G-A, MICROLITH Black C-A, MICROLITH White R-A (a pigment finely dispersed in an ethyl cellulose resin, produced by BASF, Germany), L1/S Yellow NIF, L1/8 Red F3RK-70, L1/8 Violet RN50, L1/8 Orange 501, and L1/8 Brown (a pigment finely dispersed in a nitrocellulose resin, produced by Taihei Chemicals Limited).

One of these processed pigments may be used, or two or more thereof may be mixed and used. The amount of the processed pigment used is, in the case of using the pigment alone as the colorant, from 10 to 60 wt % in terms of the pigment portion based on the total amount of the ink composition. If the amount used is less than 10 wt %, a sufficient writing line density is not obtained due to a small colorant amount, whereas if the amount used exceeds 60 wt %, the amount of solid matters becomes too large and starving occurs in writing line due to thickening with aging.

In the present invention, the ink viscosity is as high as 200,000 mPa·s or more at a shear rate of $0.019 \text{ s}^{-1}$ indicative of a standing still state, and the ink in a refill hardly allows for movement of a pigment particle, making it possible to add a pigment having a large particle diameter or a pigment having a large specific gravity, which had been conventionally limited in its addition amount because of a problem of precipitation or could not be added.

In the case of using a dye as the colorant, conventionally known dyes can be used, and specific examples thereof include a direct dye such as C.I. Direct Black 17, C.I. Direct Black 19, C.I. Direct Black 22, C.I. Direct Black 32, C.I. Direct Black 38, C.I. Direct Black 51, C.I. Direct Black 71, C.I. Direct Yellow 4, C.I. Direct Yellow 26, C.I. Direct Yellow 44, C.I. Direct Yellow 50, C.I. Direct Red 1, C.I. Direct Red 4, C.I. Direct Red 23, C.I. Direct Red 31, C.I. Direct Red 37, C.I. Direct Red 39, C.I. Direct Red 75, C.I. Direct Red 80, C.I. Direct Red 81, C.I. Direct Red 83, C.I. Direct Red 225, C.I. Direct Red 226, C.I. Direct Red 227, C.I. Direct Blue 1, C.I. Direct Blue 15, C.I. Direct Blue 41, C.I. Direct Blue 71, C.I. Direct Blue 86, C.I. Direct Blue 87, C.I. Direct Blue 106, C.I. Direct Blue 108 and C.I. Direct Blue 199; an acidic dye such as C.I. Acid Black 1, C.I. Acid Black 2, C.I. Acid Black 24, C.I. Acid Black 26, C.I. Acid Black 31, C.I. Acid Black 52, C.I. Acid Black 107, C.I. Acid Black 109, C.I. Acid Black 110, C.I. Acid Black 119, C.I. Acid Black 154, C.I. Acid Yellow 1, C.I. Acid Yellow 7, C.I. Acid Yellow 17, C.I. Acid Yellow 19, C.I. Acid Yellow 23, C.I. Acid Yellow 25, C.I. Acid Yellow 29, C.I. Acid Yellow 38, C.I. Acid Yellow 42, C.I. Acid Yellow 49, C.I. Acid Yellow 61, C.I. Acid Yellow 72, C.I. Acid Yellow 78, C.I. Acid Yellow 110, C.I. Acid Yellow 127. C.I. Acid Yellow 135, C.I. Acid Yellow 141, C.I. Acid Yellow 142, C.I. Acid Red 8, C.I. Acid Red 9, C.I. Acid Red 14, C.I. Acid Red 18, C.I. Acid Red 26, C.I. Acid Red 27, C.I. Acid Red 35, C.I. Acid Red 37, C.I. Acid Red 51, C.I. Acid Red 52, C.I. Acid Red 57, C.I. Acid Red 82, C.I. Acid Red 83, C.I. Acid Red 87, C.I. Acid Red 92, C.I. Acid Red 94, C.I. Acid Red 111, C.I. Acid Red 129, C.I. Acid Red 131, C.I. Acid Red 138, C.I. Acid Red 186, C.I. Acid Red 249, C.I. Acid Red 254, C.I. Acid Red 265, C.I. Acid Red 276, C.I. Acid Violet 15, C.I. Acid Violet 17, C.I. Acid Violet 49, C.I. Acid Blue 1, C.I. Acid Blue 7, C.I. Acid Blue 9, C.I. Acid Blue 15, C.I. Acid Blue 22, C.I. Acid Blue 23, C.I. Acid Blue 25, C.I. Acid Blue 40, C.I. Acid Blue 41, C.I. Acid Blue 43, C.I. Acid Blue 62, C.I. Acid Blue 78, C.I. Acid Blue 83, C.I. Acid Blue 90, C.I. Acid Blue 93, C.I. Acid Blue 100, C.I. Acid Blue 103, C.I. Acid Blue 104, C.I. Acid Blue 112, C.I. Acid Blue 113, C.I. Acid Blue 158, C.I. Acid Green 3, C.I. Acid Green 9, C.I. Acid Green 16, C.I. Acid Green 25, C.I. Acid Green 27 and C.I. Acid Orange 56; a food dye such as C.I. Food Yellow 3; and a basic dye such as Malachite Green (C.I. 42000) Victoria Blue FB (C.I. 44045), Methyl Violet FN (C.I. 42535), Rhodamine F4G (C.I. 45160), Rhodamine 6GCP (C.I. 45160).

One of these may be used, or two or more thereof may be mixed and used. The amount of the dye used is, in the case of using the dye alone as the colorant, from 10 to 60 wt % based on the total amount of the ink composition used. If the amount used is less than 10 wt %, a sufficient writing line density is not obtained due to a small colorant amount, whereas if the amount used exceeds 60 wt %, the amount of solid matters becomes too large and starving occurs in writing line due to thickening with aging.

In this connection, the dye, organic pigment, inorganic pigment and the like described above may be used as a mixture. In the case of using these as a mixture, the total weight of the colorants is preferably from 10 to 60 wt % based on the total amount of the ink composition used. If it is less than 10 wt %, a sufficient writing line density is not obtained due to a small colorant amount, whereas if it exceeds 60 wt %, the amount of solid matters becomes too large and starving occurs in writing line due to thickening with aging.

The rheology adjusting agent used for imparting a shear viscosity reduction to the ink and obtaining physical properties of large shear viscosity reduction and high storage modulus such that the viscosity at a shear rate of $0.019\ s^{-1}$ is 200,000 mPa·s or more, the viscosity at a shear rate of $10,000\ s^{-1}$ is 5,000 mPa·s or less and the storage modulus at an angular frequency of 0.019 rad/sec is 10 Pa or more, must have high solubility in an organic solvent, and the rheology adjusting agent must have, in its molecule, both a structure capable of forming weak bonding such as hydrogen bonding and a structure capable of forming strong bonding such as entanglement of polymer chains. Because, only when both a loose network (viscous element) established through a weak bond such as hydrogen bond and susceptible to collapse by a shear force and a network working out to a strong elastic element, such as entanglement of polymer chains, are contained and the rheology adjusting agent having such characteristics shows good dissolution in the ink and extends the molecular chain in the ink, the large shear viscosity reduction and viscosity recovery can be achieved, and both high viscosity/high storage modulus during standing still, that is, at a shear rate of $0.019\ s^{-1}$, and low viscosity when a shear force is applied, can be satisfied.

As long as the viscosity at a shear rate of $10,000\ s^{-1}$ is 100 mPa·s or more, even when the storage modulus at an angular frequency of 0.019 rad/sec takes a low numerical value in the range of 10 Pa or more, substantially blurless writing line is obtained. Also when the viscosity is less than 100 mPa·s, as long as the storage modulus at an angular frequency of 0.019 rad/sec is 10 Pa or more, blurless writing line may be obtained, but since the viscosity at the moment of writing is low until the viscosity returns to a standing still state, that is, a state at a shear rate of $0.019\ s^{-1}$, slight blur occurs as compared with the case where the viscosity is 100 mPa·s or more.

Also, as the storage modulus at an angular frequency of 0.019 rad/sec is higher, the viscosity recovery rate of the ink on writing line becomes higher, and therefore, the ink on the writing line rapidly recovers a viscosity of 200,000 mPa·s or more at which bleeding or wet spreading does not occur, as a result, writing line more successfully free from slight unevenness or feathering at the boundary between the writing line and a paper sheet is obtained, but in order to obtain an extremely large storage modulus, a large amount of solid matters such as shear viscosity reduction-imparting agent and other resins must be added to the ink. When a shear viscosity reduction-imparting agent is added in a large amount, the amount of the shear viscosity reduction-imparting agent relative to the solvent becomes large and for obtaining sufficient solubility, the solvent composition or the amount of other solid matters is restricted. Also, when solid matters such as other resins are added in a large amount to the ink, the viscosity at a shear rate of $10,000\ s^{-1}$ is increased in conjunction therewith, and balancing with the viscosity of 5,000 mPa·s or less cannot be achieved. For these reasons, the storage modulus is actually set to 2,000 Pa or less, and this advantageously makes it easy to keep balance with various quality characteristics as a ballpoint pen.

Specific examples of the rheology adjusting agent include a natural polysaccharide, a synthetic polysaccharide, an acrylic resin, a polyvinyl alcohol resin, a polyvinyl-based resin, and a polyamide wax. Among these, a cellulose derivative and/or a mucopolysaccharide show high solubility in an organic solvent and are very effective in terms of thickening effect or shear viscosity reduction-imparting effect because of their structure having regularly both a hydrophobic skeleton and many hydroxyl groups in as a small unit as one molecule of a polymerization monomer.

According to a combination of a cellulose derivative and/or a mucopolysaccharide with a solvent for dissolving these, a weak network by hydrogen bonding between a cellulose derivative and/or a mucopolysaccharide and solvent can be produced by using a cellulose derivative and/or a mucopolysaccharide having a large number of hydroxyl groups per molecule or increasing the hydroxyl group amount in an organic solvent in the ink, an elastic state can be made to predominate in the ink during standing still not subject to a shear force, and tan δ as small as tan δ of less than 1.0 at an angular frequency of 0.019 rad/sec can be achieved. Also, the cellulose derivative and/or mucopolysaccharide need to show good dissolution in the ink and therefore, appropriate materials must be combined so as to prevent the solubility from deteriorating due to crystallization of the resin or formation of a lump.

As the tan δ is smaller, the ink is less likely to spread to a paper space absent of writing line from the writing line portion defined at the moment of transfer, and therefore, thin writing line is achieved, but in order to obtain an extremely small tan δ<0.05, a large amount of a shear viscosity reduction-imparting agent must be added to the ink. As a result, the amount of the shear viscosity reduction-imparting agent relative to the solvent becomes large and for obtaining sufficient solubility, the solvent composition or the amount of other solid matters is restricted. For these reasons, the tan δ is actually set to 0.05 or more, and this advantageously makes it easy to keep balance with various quality characteristics as a ballpoint pen.

The cellulose derivative and/or mucopolysaccharide are added as a rheology adjusting agent, for example, to impart a shear viscosity reduction to the ink. Specific examples of the cellulose derivative include methyl cellulose, ethyl cellulose, hydroxymethyl cellulose, hydroxypropyl cellulose, hydroxyethyl-methyl cellulose, hydroxyethyl-ethyl cellulose, hydroxyethyl-methylethyl cellulose, a hydroxyethyl longchain alkyl ethyl cellulose, hydroxypropylmethyl cellulose, a cationized cellulose, and a phthalate compound or acetate compound thereof. Specific examples of the mucopolysaccharide include hyaluronic acid, chondroitin, heparin, and keratan acid (all mucopolysaccharides).

Among these, ethyl cellulose can realize, in a wider range of blending formulations, all of high shear viscosity reduction, large storage modulus, and tan δ of less than 1.0, because of good solubility in an organic solvent and viscoelastic characteristics of the resin itself. Specific examples of the commercial product thereof include ETHOCEL 4, ETHOCEL 7, ETHOCEL 10, ETHOCEL 14, ETHOCEL 20, ETHOCEL 45, ETHOCEL 70, ETHOCEL 100, ETHOCEL 200, ETHOCEL 300 (produced by The Dow Chemical Company), Aqualon N50, Aqualon N100, Aqualon N200, and Aqualon N300 (produced by Ashland Inc., U.S.A.)

The ethyl cellulose produces an effect of pigment dispersion or pigment dispersion stabilization by the bonding of the hydrophobic group moiety to a pigment and therefore, also when a pigment is used, there is obtained an effect of enhancing the pigment dispersibility or pigment dispersion stability in the ink and thereby reducing the viscosity change with aging in the ink.

Also, as described above, a pigment previously finely dispersed in the ethyl cellulose may be formed into a particle and used. Specific examples thereof include MICROLITH Yellow 4G-A, MICROLITH Yellow MX-A, MICROLITH Yellow 2R-A, MICROLITH Brown 5R-A, MICROLITH Scarlet R-A, MICROLITH Red 2C-A, MICROLITH Red 3R-A, MICROLITH Magenta 2B-A, MICROLITH Violet B-A, MICROLITH Blue 4G-A, MICROLITH Green G-A, MICROLITH Black C-A, and MICROLITH White R-A (a pigment finely dispersed in an ethyl cellulose resin, produced by BASF, Germany).

The amount of the cellulose derivative and/or mucopolysaccharide added is preferably from 1.0 to 20 wt % based on the total amount of the ink composition used. If the amount used is less than 1.0 wt %, the amount of the resin is too small and for achieving a high viscosity of 200,000 mPa·s or more at a shear rate of 0.019 $s^{-1}$, the blending is restricted, for example, a large number of other solid matters must be added, whereas if the amount added exceeds 20 wt %, the viscosity is excessively raised and when writing is performed at a high speed, the followability of the ink cannot keep up and unevenness occurs in the written line.

Also, when the viscosity at a shear rate of 0.019 $s^{-1}$ is 200,000 mPa·s or more, the ink on writing line can be kept from immediately bleeding or wet spreading, but when the viscosity is 500,000 mPa·s or more, furthermore 1,000,000 mPa·s or more, an ink in the state of being more reduced in the bleeding and wet spreading is obtained. If the viscosity at a shear rate of 0.019 $s^{-1}$ exceeds 30,000,000 mPa·s, when the writing speed is high, even by pressurizing the ink by a spring, a compressed air or the like, staving or ink depletion of writing line is caused by the following failure of the ink due to excessively high viscosity. Furthermore, if the viscosity exceeds 50,000,000 mPa·s, also when the writing is performed at a normal writing speed (7 cm/sec), staving or ink depletion of writing line occurs. Therefore, the viscosity at a shear rate of 0.019 $s^{-1}$ is preferably 50,000,000 mPa·s or less, more preferably 30,000,000 mPa·s or less.

Moreover, preferably, 2% or more of a cellulose derivative and/or a mucopolysaccharide is incorporated into the ink, and the amount of a pigment is set to 4.5 times or more the amount of the cellulose derivative and/or mucopolysaccharide. In this case, the content of the cellulose derivative and/or mucopolysaccharide in the ink is sufficiently large and in addition, a pigment uniformly intrudes physically into a gap between cellulose derivatives and/or mucopolysaccharides, whereby the network of the ink is likely to collapse with a smaller shear force, so that all of high viscosity of the ink during standing still, high shear viscosity reduction, and large storage modulus during standing still can be achieved in a wide range of blending formulations. Furthermore, the cellulose derivative and/or mucopolysaccharide have an adsorption ability to a pigment and come to assist in the dispersion of a pigment and in turn, an oil-based ink composition excellent also in the pigment dispersibility and pigment dispersion stability is obtained.

The polyhydric alcohol is added for the purpose of forming hydrogen bonding with an OH group of the polyhydric alcohol to break off crystallization established by intramolecular or intermolecular strong hydrogen bonding between OH groups of the cellulose derivative and/or mucopolysaccharide and thereby enhancing the solubility of the cellulose derivative and/or mucopolysaccharide.

Specific examples thereof include ethylene glycol, diethylene glycol, triethylene glycol, polyethylene glycol, propylene glycol, dipropylene glycol, tripropylene glycol, polypropylene glycol, butylene glycol, pentylene glycol, 2-methyl-1,3-propanediol, 1,2-butanediol, 1,3-butanediol, 1,4-butanediol, 2,3-butanediol, 2-methyl-2,3-butanediol, 3-methyl-1,3-butanediol, 2-methyl-1,3-butanediol, 1,5-pentanediol, 1,2-pentanediol, 2,4-pentanediol, 3-methyl-1,5-pentanediol, 1,2-hexanediol, 2,5-hexanediol, hexylene glycol (2-methyl-2,4-pentanediol), 2,4-dimethyl-2,4-pentanediol, 1,2-heptanediol, 1,6-heptanediol, and 1,7-heptanediol.

If the blending amount in the ink is 0.5 wt % or less, a sufficiently high effect of enhancing the solubility of the cellulose derivative and/or mucopolysaccharide is not obtained. Therefore, the polyhydric alcohol is preferably added in an amount of 0.5 wt % or more.

Among these polyhydric alcohols, preferred are those having a carbon number of 6 or more in a solvent, which can suppress moisture absorption into the ink.

The polyhydric alcohol having a carbon number of 6 or more in a solvent has high affinity also for an organic solvent exhibiting a relatively low solubility parameter in a polyhydric alcohol and having a solubility parameter of 8.0 to 9.5, and therefore, a more uniformly mixed state is provided, so that the cellulose derivative and/or mucopolysaccharide can be uniformly dissolved and a stable ink composition hardly causing ink depletion of writing line due to an insoluble matter and being reduced in the viscosity change even with aging can be obtained.

The organic solvent having a solubility parameter of 8.0 to 9.5 is added as a solvent to control the dissolution state such that the dissolution rate is prevented from increasing excessively while keeping high solubility of the cellulose derivative and/or mucopolysaccharide. In addition, the organic solvent appropriately dissolves also the dispersed resin, so that the balance of affinity among the pigment, the dispersed resin and the organic solvent can be maintained and high dispersion stability can be also obtained.

Specific examples thereof include an ethylene glycol-2-ethylhexyl ether (boiling point: 229° C., SP value: 9.0, an organic solvent containing a hydroxyl group and no oxypropylene group in the molecule), a diethylene glycol-2-ethylhexyl ether (boiling point: 272° C., SP value: 9.2, an organic solvent containing a hydroxyl group and no oxypropylene group in the molecule), an ethylene glycol isopropyl ether (boiling point: 141.8° C., SP value: 9.2, an organic solvent containing a hydroxyl group and no oxypropylene group in the molecule), a diethylene glycol monobutyl ether (boiling point: 230.6° C., SP value: 9.5, an organic solvent containing a hydroxyl group and no oxypropylene group in the molecule), a diethylene glycol isobutyl ether (boiling point: 220° C., SP value: 8.7, an organic solvent containing a hydroxyl group and no oxypropylene group in the molecule), a monohydric alkyl alcohol having a carbon number of 9 or more such as 2-ethylhexanol (boiling point: 183.5° C., SP value: 9.5, an organic solvent containing a hydroxyl group and no oxypropylene group in the molecule), 3-methoxy-3-methyl-1-butanol (boiling point: 174° C., SP value: 9.3, an organic solvent containing a hydroxyl group and no oxypropylene group in the molecule) and lauryl alcohol (boiling point: 259° C., SP value: 8.1, an organic solvent containing a hydroxyl group and no oxypropylene group in the molecule), a propylene glycol normal-propyl ether (boiling point: 150° C., SP value: 9.4, an organic solvent containing an oxypropylene group in the molecule), a propylene glycol normal-butyl ether (boiling point: 170° C., SP value: 8.9, an organic solvent containing an oxypropylene group in the molecule), a propylene glycol diacetate (boiling point: 190° C., SP value: 8.9, an organic solvent containing an oxypropylene group in the molecule), a dipropylene glycol normal-methyl ether (boiling point: 190° C., SP value: 9.4, an organic solvent containing an oxypropylene group in the molecule), a dipropylene glycol normal-propyl ether (boiling point: 212° C., SP value: 8.6, an organic solvent containing an oxypropylene group in the molecule), a dipropylene glycol normal-butyl ether (boiling point: 229° C., SP value: 8.2, an organic solvent containing an oxypropylene group in the molecule), a dipropylene glycol dimethyl ether (boiling point: 171° C., SP value: 8.2, an organic solvent containing an oxypropylene group in the molecule), a dipropylene glycol methyl ether acetate (boiling point: 209° C., SP value: 8.6, an organic solvent containing an oxypropylene group in the molecule), a tripropylene glycol normal-methyl ether (boiling point: 242° C., SP value: 8.7, an organic solvent containing an oxypropylene group in the molecule), a tripropylene glycol normal-butyl ether (boiling point: 274° C., SP value: 8.1, an organic solvent containing an oxypropylene group in the molecule), a diethylene glycol diethyl ether (boiling point: 188.9° C., SP value: 8.6), and a 3-methoxy-3-methyl-butyl acetate (boiling point: 188° C., SP value: 8.5).

In order to prevent drying of the pen nib, the boiling point of the organic solvents is preferably 150° C. or more.

Above all, among the solvents having an SP value of 8.0 to 9.5, when an organic solvent containing an oxypropylene group in the molecule and an organic solvent containing a hydroxyl group and no oxypropylene group in the molecule are used in combination, the cohesive force of the solvent itself is appropriate by virtue of having an SP value of 8.0 to 9.5 and at the same time, affinity for ethyl cellulose is obtained. Furthermore, the oxypropylene group is weakly bonded temporarily to a hydrophilic group or a hydrophobic skeleton such as hydrogen bonding of the cellulose derivative and/or mucopolysaccharide to temporarily protect the group or skeleton, whereby while the action itself of the hydroxyl group of a polyhydric alcohol or an organic solvent containing a hydroxy group and no oxypropylene group in the molecule to disrupt hydrogen bonding is not inhibited, the hydrogen bonding can be merely retarded. The polyhydric alcohol or the organic solvent containing a hydroxyl group and no oxypropylene group in the molecule has appropriately high solubility for the resin, nevertheless, is bonded at a slow rate to the crystallized hydroxyl group or skeleton of the cellulose derivative and/or mucopolysaccharide, thereby producing a great effect of preventing the resin particle from growing into a lump, and can disrupt the hydrogen bonding of the cellulose derivative and/or mucopolysaccharide after penetrating into the inside of the resin particle, as a result, the crystallization can be more sufficiently broken off and a preferred dissolution state can be obtained. It is presumed that this makes it possible to prevent the cellulose derivative and/or mucopolysaccharide from undergoing insufficient dissolution or growing into a lump-like particle to block the ink flow or starve the writing line, or suppress a separation phenomenon of the solvent with aging.

Also, when the organic solvent having an SP value of 8.0 to 9.5 and containing a hydroxyl group and no oxypropylene group in the molecule is infinitely mixed with water, even if the ink absorbs moisture under a high-humidity environment, water is not allowed to exist as a separating layer in the ink, and precipitation due to partial insolubilization of ethyl cellulose does not occur, because respective components are uniformly mixed.

In addition, when the solvent molecule contains an oxyethylene group, the viscosity of the solvent becomes high due to the hydrogen bonding force of oxyethylene groups with each other and therefore, the penetration force for the solute tends to decrease, but the organic solvent having an SP value of 8.0 to 9.5 and containing a hydroxyl group and no oxypropylene group in the molecule has a higher penetration force for the solute according to its structure not containing an oxyethylene group in the molecule, so that ethyl cellulose can show better dissolution. Furthermore, the hydrogen bonding force of oxyethylene groups greatly depends on the temperature and at low temperatures, the cohesive force between solvents is strengthened, generating a concern about reduction in the solubility of ethyl cellulose, but when the solvent does not contain an oxyethylene group in the molecule, the temperature dependency of the cohesive force of the solvent is reduced and therefore, the solubility is little changed even at low temperatures.

A conventionally-known organic solvent for ballpoint pens may be used in combination other than the above-described organic solvents. In view of pen nib drying, the boiling point is preferably 150° C. or more, and when the product form is of a cap type, a solvent having a boiling point of 150° C. or less can be used. For example, a glycol ether-based solvent such as ethylene glycol monobutyl ether, ethylene glycol monohexyl ether, ethylene glycol monophenyl ether, ethylene glycol monobenzyl ether, diethylene glycol monomethyl ether, diethylene glycol monoethyl ether, diethylene glycol monohexyl ether, diethylene glycol monophenyl ether, diethylene glycol monobenzyl glycol, propylene glycol normal-butyl ether, polyethylene glycol monophenyl ether, dipropylene glycol monoethyl ether, dipropylene glycol monophenyl ether and tripropylene glycol monophenyl ether; a glycol-based solvent such as ethylene glycol, diethylene glycol, propylene glycol, dipropylene glycol, hexylene glycol, glycerin and polyethylene glycol; an ester-based solvent such as 2-ethylhexyl acetate, isobutyl isobutyrate, ethyl lactate and butyl lactate; an alcohol-based solvent such as benzyl alcohol, β-phenylethyl alcohol, α-methylbenzyl alcohol, lauryl alcohol, tridecyl alcohol, isododecyl alcohol and isotridecyl alcohol, can be used.

One of these may be used alone, or two or more thereof may be mixed and used. The blending amount is from 20 to 90 wt %, preferably from 35 to 75 wt %, based on the total amount of the ink. If the blending amount is less than 20 wt %, starving of writing line occurs due to an excessively large solid content, whereas if the blending amount exceeds 90 wt %, the amount in which the colorant, fixing resin or the like can be blended is too small and therefore, a sufficient writing line density is not obtained.

Also, a resin usually used as a fixing agent or a dispersant in a ballpoint pen ink composition, for example, a ketone resin, a sulfoamide resin, an acrylic resin, maleic acid resin, a copolymer of styrene and a maleic acid ester, a copolymer of styrene and an acrylic acid or an ester thereof, an ester gum, a xylene resin, a urea resin, a polyamide resin, an alkyd resin, a phenol resin, an alkylphenol resin, a terpene-phenol resin, a rosin-based resin or a hydrogenated compound thereof, polyvinylbutyral, polyvinylacetal, polyvinyl alkyl ether, polyvinylpyrrolidone, and polyethylene oxide can be used in combination. One of these resins may be used alone, or two or more thereof may be mixed and used. The blending amount thereof is from 0.1 to 15 wt % based on the total amount of the ink composition.

Such a resin has an action of adjusting the viscosity of the ink composition or enhancing the fixing property, water resistance and the like.

In addition, a preservative such as isothiazoline-based compound, benzoic acid and paraben, a rust inhibitor such as benzotriazole-based compound, phosphoric acid ester-based compound, amine salts and lower fatty acid-based compound, a defoaming agent such as silicone type, surfactant type, polyether type and higher alcohol type, a lubricant such as phosphoric acid ester, N-acylamino acid and silicone oil, a dispersant such as butyral resin, styrene acrylic acid resin and styrene maleic acid resin, a starvation inhibitor such as phosphoric acid ester, hydrogenated castor oil and unsaturated fatty acid, a leakage inhibitor such as resin particle, inorganic particle, fluorine-containing surfactant and silicone-containing surfactant, and an auxiliary agent conventionally used for an ink composition, such as anionic, cationic or amphoteric surfactant, may be contained, if desired.

The ink composition for a ballpoint pen of the present invention is obtained by dispersing and mixing the above-described respective components by using a disperser such as Dynomill, ball mill, roll mill, attritor, sand grinder, lab mixer and homomixer.

A pressurized ballpoint pen filled with the oil-based ink composition for a ballpoint pen of the present invention is described below by referring to the drawings attached hereto.

A writing instrument body 1 consists of a shaft tube 2, a ballpoint pen tip 4 press-fitted into a front end opening 3 of the shaft tube 2, an ink composition 5 housed in the shaft tube 2, a liquid grease 6 arranged in close contact with the rear end of the ink composition 5, a sliding plug 7 arranged in close contact with the rear end of the grease 6, a coil spring 8 arranged behind the sliding plug 7, and an end closer 10 capable of preventing falling off of the coil spring 8 and pressed into a rear end opening 9 of the shaft tube 2. This is one example of a so-called pressurized writing instrument.

The ballpoint pen tip 4 consists of a ball holder 13 for holding a ball 11 as a writing member in the state of partially protruding from a front end opening 12 of a through hole, and the front end opening 12 of the ball holder 13 is processed to reduce its diameter to be smaller than the diameter of a ball 11 so as to prevent a slip out of the ball 11. Also, a plurality of inward projections 14 are radially provided at a rear location relative to the center of the ball 11 on the inner wall of the through hole of the ball holder 13 to restrict the backward movement of the ball 11.

The sliding plug 7 is biased forward by a resilient force of the coil spring 8 to bias the grease 6 and the ink composition 5 forward. As a result, the ink composition 5 is inserted into an inner hole 15 of the ballpoint pen tip 4 from the inside of the shaft tube 2, then fed to the surface of the ball 11 and transferred to a to-be-written surface such as paper along with rotation of the ball 11 to form writing line.

In this Example, the number of component members is reduced by pressing the ballpoint pen tip 4 directly into the front end opening 3 of the shaft tube 2 to make up the pen nib, but it may be also possible to press-fit a tip holder rear part working out to a connection member into the front end opening 3 of the shaft tube 2 and press-fit the ballpoint pen tip 4 into a front end opening of the tip holder, thereby making up the pen nib.

Also, in a pressurized writing instrument, a pressure is applied to the ballpoint pen tip 4 and the tip holder through the ink composition 5 and therefore, the ballpoint pen tip 4 and the tip holder are preferably set to a higher slip-out strength than usual so as to prevent a slip out from the tip holder or the shaft tube 2. For example, there are a method of providing a wedge-shaped projection on the outer circumference of a press-fit part 16 of the ballpoint pen tip 4 to engage with the inner surface of the tip holder or the shaft tube 2, a method of bonding or welding the press-fit part 16 of the ballpoint pen tip 4 to the tip holder or the shaft tube 2, and a method of swaging the tip holder or the shaft tube 2 from the outer circumferential side in the press-fit part 16 of the ballpoint pen tip 4. Similarly, the slip-out strength can be enhanced, for example, by a method of providing a wedge-shaped projection on the outer circumference of a press-fit part of the tip holder to achieve an engagement with the inner surface of the shaft tube 2, a method of bonding or welding the press-fit part of the tip holder to the shaft tube 2, or a method of swaging the shaft tube 2 from the outer circumferential side in the press-fit part of the tip holder.

As the material for the ball holder 13 of the ballpoint pen tip 4, a stainless steel may be preferably used because of easy processability, durability, corrosion resistance and the like, but as long as it is a highly machinable material rich in plastic deformability, an alloy such as nickel silver and brass may be appropriately selected. Also, as the material for the ball 11, a super-hard material containing, as the main component, tungsten carbide, titanium, cobalt, chromium, nickel or the like, and a ceramic such as silicone carbide, titanium nitride, alumina and zirconia may be used.

In this connection, in this Example, a ballpoint pen is described as one example of the writing instrument, but in the case of a structure, for example, where an ink composition is not pressurized at normal time and only when a certain specific operation such as knocking is applied, the ink composition is pressurized or where a valve structure is provided behind the pen nib and the feed of the ink composition to the pen nib can be thereby controlled, a fiber pen nib obtained by polishing and cutting a fiber bundle, a resin pen nib formed by a sintered body or extrusion molding, and the like can be appropriately employed.

The grease 6 is not necessarily required, but in the case of using a sliding plug compatible with the ink composition 5, the grease can work as a partition between the ink composition 5 and the sliding plug 7. Also, in this Example, the grease 6 moves forward along with consumption of the ink composition 5 and is used to discharge the ink composition 5 in the writing instrument body with no waste and no remaining till the last.

Examples of the grease 6 include an aqueous grease obtained by thickening of water, ethylene glycol or glycerin, and an oily grease obtained by gelling or thickening of silicone, liquid paraffin, polybutene or alpha-olefin, and a grease incompatible with the sliding plug 7 and capable of inhibiting the inversion with the ink composition 5 is appropriately selected by taking into consideration the specific gravity difference or affinity.

The sliding plug 7 in this Example has an annular projection 18 in the middle part of the outer circumference of a cylinder part 17. The annular projection 18 has an outer shape of the middle part bulging in an arc like a barrel and is circumferentially put into contact with the inner wall of the shaft tube 2 in the state of elastically deforming in the top portion of the arc as well as in the vicinity thereof.

In this connection, the shape of the sliding plug 7 can be appropriately selected from a sphere, a bottomed cylinder and the like according to the purpose. Also, in the shaft tube 2, the sliding plug 7 moves forward along with consumption of the ink composition 5 while preventing leakage of the liquid from the rearward and therefore, as long as the slidability and liquid tightness are satisfied, a plurality of annular projections 18 may be formed at appropriate locations, and the shape thereof may be a shape formed by connecting two or more of arcs, curves and straight lines. Furthermore, the sliding plug 7 body and the annular projection 18 may be formed as separate bodies composed of different materials and may be connected and used.

The rear end of the sliding plug 7 surrounds the forward part of the coil spring 8 from the inner circumferential side and thereby restricts the inflection of the forward part of the coil spring 8. According to this restriction, a force acting from the forward part of the coil spring 8 on the sliding plug 7 is corrected to act linearly, as a result, the sliding plug 7 is straightly (horizontally) pressurized in the axial direction.

In this way, the sliding plug 7 is prevented as much as possible from inclining or non-uniformly deforming, whereby stable liquid tightness, efficient pressurizing force transmission and smooth sliding are realized. Also, depending on the outer and inner diameters of the coil spring 8, a configuration where the forward part of the coil spring 8 is surrounded from the outer circumferential side, for example, by making the rear end side of the sliding plug 7 to be a cylindrical opening may be employed.

In this connection, the outer diameter of the annular projection 18 must be set sufficiently large for the inner wall of the shaft tube 2 to ensure liquid tightness, because in a pressurized writing instrument, a pressure is applied to the ink composition 5 or the grease 6 by a pressurizing system and therefore, there is a risk that the ink composition 5 or the grease 6 may push its way through the gap between the annular projection 18 of the sliding plug 7 and the inner wall of the shaft tube 2 and leak out to the rearward of the sliding plug 7. On the other hand, in order to obtain smooth sliding, it is preferred to generate no extra sliding resistance, and the portion except for the annular projection 18 need to be set smaller than the inner diameter of the shaft tube 2. That is, the difference between the minimum outer diameter of the annular projection 18 and the maximum outer diameter of the annular projection 18 may become large. Also, when a parting line of a mold is formed on the annular projection 18 during molding of the sliding plug 7, the liquid tightness is impaired. Therefore, the entirety of the annular projection 18 must be put in one mold.

For this purpose, at the time of withdrawing the sliding plug 7 from the mold, the molded annular projection 18 must climb over the mold by the amount of difference between the minimum outer diameter of the annular projection 18 and the maximum outer diameter of the annular projection 18, and as the outer diameter difference is larger, the withdrawing becomes more difficult.

Therefore, in the sliding plug 7 of this Example, a step part 19 having an outer diameter larger than the cylinder part 17 and smaller than the maximum outer diameter of the annular projection 18 is provided between the cylinder part 17 and the annular projection 18, and the parting line of the mold is formed on the step part 19. Then, the portion put in one mold is made to involve from the maximum outer diameter of the annular projection 18 to the step part 19, whereby the diameter difference of the mold, which must climb over, is reduced and the ease of withdrawing the sliding plug 7 from the mold is enhanced.

The material for the sliding plug 7 in this Example is a nitrile rubber having an Asker C hardness of 50, but butyl rubber, silicone rubber, other rubber materials or elastomers, a polyethylene resin, a polypropylene resin, and the like may be also used, and as long as the slidability and liquid tightness in the shaft tube 2 are good and a change in the property or shape, such as dissolution and decomposition, does not occur with the ink composition 5 or the grease 6, the material can be appropriately selected.

The shaft tube 2 in this Example is an injection-molded article of a polypropylene resin, but as long as a change in the property or shape, such as dissolution and decomposition, is not caused by the ink composition 5 and the grease 6 and it is a material low in the water vapor permeability, for example, a resin such as fluorine and nylon, the resin above of which surface is subjected to aluminum deposition or silicone oxide deposition, a resin having mixed therein an aluminum powder or a glass powder, and a metal such as stainless steel and brass, may be used, or the shaft tube may be also an extrusion-molded article.

The pressurizing force of the coil spring 8 may be set strong by using a coil spring having a large wire diameter, but when the outer diameter of the coil spring 8 is small, the size of the wire diameter is limited. Accordingly, the coil spring 8 has a large outer diameter to a certain extent, but for housing such a coil spring 8 in the shaft tube 2, the inner diameter of the shaft tube 2 must be also large. However, when the inner diameter of the portion housing the ink composition 5 is increased in accordance therewith, the forward moving distance of the ink composition 5 interface for the consumption of the ink composition 5 becomes short, and it may become very difficult for the user to recognize, for example, to what extent the interface moves forward by what amount of writing or how much longer the writing can be performed.

Therefore, the inside of the shaft tube 2 is divided into a small diameter part 20 for housing the ink composition 5 and the grease 6 and a large diameter part 21 for housing a part of the grease 6, the sliding plug 7 and the coil spring 8, whereby a coil spring having a strong pressurizing force can be housed and at the same time, the forward moving distance of the ink composition 5 interface for the consumption of the ink composition 5 can be increased, making it easy for the user to recognize the consumption of the ink composition 5.

Also, the inner surface of the shaft tube until using up the ink composition 5 is formed such that only the section where the sliding plug 7 slides is made straight and the remaining section is tapered by gradually reducing the diameter from the rear end to the front end of the shaft tube 2. By making straight the section where the sliding plug 7 slides, the press-fit amount of the inner wall of the shaft tube 2 and the annular projection 18 of the sliding plug 7 is kept constant, and stable sliding resistance and liquid tightness are maintained. However, since the shaft tube 2 is an injection-molded article, it is originally preferred to taper the entire inner surface of the shaft tube 2 so as to facilitate pulling out of a molding pin (core pin). Therefore, by utilizing the inner diameter difference between the small diameter part 20 and the large diameter part 21, the forward moving distance of the sliding plug 7 for the consumption of the ink composition 5, that is, the straight section, is shortened, whereby balancing with moldability is realized.

The connection part 22 between the small diameter part 20 and the large diameter part 21 of the shaft tube 2 may be formed in a right-angled step shape by abruptly changing the inner diameter, but in this Example, the connection part 22 is formed in a funnel shape by gradually changing the inner diameter.

In the case of forming the connection part 22 by abruptly changing the inner diameter, the wall surface of the connection part rising at a right angle completely dams up a part of the grease 6 flowing forward in the shift direction. On the other hand, the connection part 22 formed by gradually changing the inner diameter allows the grease 6 flowing forward in the shaft direction to flow through forward with no complete damming in parts. That is, the flow resistance causing a push back of the grease 6 by the wall surface of the connection part 22 is suppressed and the loss of the pressurizing force transmitted to the ink composition 5 is reduced, whereby the ink composition 5 can be more efficiently biased.

Furthermore, when the connection part 22 is formed in a shape matching the forward part of the sliding plug 7, the amount of the grease 6 remaining in the connection part 22 on using up the ink composition 5 is decreased, and the grease 6 can be used with no waste for replacing the ink composition 5. In turn, the initial filling amount of the grease 6 can be set to be small, and the production cost can be kept low.

On the inner wall of the shaft tube 2, a thin groove 23 working out to an air escape route at the time of inserting the sliding plug 7 is extended between the rear end of the shaft tube 2 and near the rear end of the grease 6 to break off a closed state circumferentially created with the inner wall of the shaft tube 2 when inserting and moving the sliding plug 7 on its loading. In the case where the sliding plug 7 is inserted through the rear end opening 9 of the shaft tube 2 in the state of the inside of the shaft tube 2 being already filled with the ink composition 5 and the grease 6, the air in the shaft tube 2 is not pushed forward but discharged to the outside of the shaft tube 2 through the thin groove 23. The air in the shaft tube 2 is not compressed between the grease 6 and the sliding plug 7 and does not push back the sliding plug 7 rearward, so that the sliding plug 7 can be easily inserted until coming into contact with the rear end interface of the grease 6. As long as the annular projection 18 of the sliding plug 7 does not intrude into the thin groove 23 to obstruct the flow of air, the transverse cross-sectional shape of the thin groove 23 may be a rectangle, a semicircle or a fan, and a plurality of thin grooves may be formed.

In this connection, near the rear end of the grease 6 means a site at which the annular projection 18 of the sliding plug 7 is located when the sliding plug 7 comes into contact with the rear end interface of the grease 6, and this is set such that on the forward side relative to the position above, the inner wall of the shaft tube 2 and the annular projection 18 of the sliding plug 7 are slidably put into contact with each other throughout the circumference.

The coil spring 8 is a pressurizing system for biasing the sliding plug 7 forward to assist in discharging the ink composition 5, and the coil spring 8 is provided by compressing it in the state of the front end abutting against the rear surface 24 of the sliding plug 7 and the rear end abutting against the front surface 25 of the end closer 10.

The coil spring 8 is made of a stainless steel, but the material may be appropriately selected from a piano wire, a resin and the like according to the required characteristics. Also, as long as the sliding plug 7 can be biased forward, the pressurizing system is not limited to the system of this Example but may be a leaf spring or may be an elastic steel material, a compressed air, a pressurizing pump or the like, which is disposed in a curved state.

The end closer 10 is a member to restrict the backward movement of the coil spring 8 and is always applied with a pressure toward the rear side by the coil spring 8 and therefore, a wedge-shaped projection is provided on the outer circumference of the press-fit part 26 of the end closer 10 to achieve an engagement with the inner surface of the shaft tube 2, but the press-fit part 26 may be bonded or welded to the shaft tube 2 or the shaft tube 2 may be swaged from the outer circumferential side to enhance the slip-out strength. Also, in place of the end closer 10, as a technique for preventing a fall off of the oil spring 8, for example, a pressure may be applied to the shaft tube 2 from the outside to reduce the inner diameter, a part of the shaft tube 2 may be forced inwardly to provide an abutting part for abutting the rear end of the coil spring 8, or a projection may be provided on the inner wall of the shaft tube 2 to hook the rear and part of the coil spring 8. Furthermore, the rear end of the coil spring 8 may be fixed to the shaft tuber 2, for example, by bonding or welding the shaft tube 2 and the rear end part of the coil spring 8. At this time, as for the fixing portion, the rear end is preferably fixed at the entire circumference or fixed diagonally at two or more points. In the case where the pressurizing system is, for example, a compressed air, the end closer 10 may be a tail plug having hermeticity. The end closer 10 having hermeticity includes, for example, a device having a projection on the side surface thereof and a device capable of sealing off the thin groove 23 by the deformation or the like of the end closer 10 itself. Also, in the case where the air in the shaft tube 2 is compressed to such an extent as preventing the sliding plug 7 from being pushed back to the rearward, the end closer 10 may be formed to have no air passing hole by not forming the thin groove 23 only in the region necessary for hermetization from the rear end of the shaft tube 2.

In this Example, the shape thereof is cylindrical, and the rearward of the sliding plug 7 communicates with the outside air, whereby the thin groove 23 in the press-fit part for forming a space on the shaft tube 2 is maintained unsealed and capable of passing air so as to facilitate the forward movement of the sliding plug 7. In addition, when the air can be passed, for example, by using a cylindrical end closer or providing a groove on the side surface of the end closer, it is not necessarily required to maintain the thin groove 23 in the press-fit portion to enable air passing.

EXAMPLES

Example 1

| | |
|---|---|
| Mitsubishi Carbon #25 (carbon black, produced by Mitsubishi Chemical Co., Ltd.) | 19.90 parts by weight |
| MICROLITH Black C-A (a processed pigment obtained by finely dispersing a pigment in an ethyl cellulose carrier, ratio between Pigment Black 7 and ethyl cellulose: 6:4, produced by BASF, Germany) | 14.20 parts by weight |
| S-LEC BL-1 (polyvinylbutyral, dispersant, produced by Sekisui Chemical Co., Ltd.) | 2.80 parts by weight |
| HILAC 901 (ketone resin, produced by Hitachi Chemical Co., Ltd.) | 5.00 parts by weight |
| PVP K-90 (polyvinylpyrrolidone, produced by ISP Japan) | 0.40 parts by weight |
| Hexylene glycol (polyhydric alcohol, SP value: 10.5) | 30.30 parts by weight |
| Tripropylene glycol normal-butyl ether (SP value: 8.1) | 17.10 parts by weight |
| 3-Methoxy-3-methyl-1-butanol (SP value: 9.3) | 5.00 parts by weight |
| Phenyl glycol (SP value: 11.5) | 5.30 parts by weight |

S-LEC BL-1 and all solvents in the components above were heated with stirring, and Mitsubishi Carbon #25 was added and dispersed for 1 hour by a bead mill. The obtained pigment dispersion and the remaining components were mixed under heating with stirring by a lab mixer to obtain a black ink having, at 25° C., a viscosity of 1,920,500 mPa·s at a shear rate of 0.019 s$^{-1}$, a viscosity of 873 mPa·s at a shear rate of 10,000 s$^{-1}$, a storage modulus of 200 Pa at 0.019 rad/sec, and tan δ of 0.76 at 0.019 rad/sec.

Example 2

| | |
|---|---|
| Mitsubishi Carbon #25 (carbon black, produced by Mitsubishi Chemical Co., Ltd.) | 19.90 parts by weight |
| MICROLITH Black C-A (a processed pigment obtained by finely dispersing a pigment in an ethyl cellulose carrier, ratio between Pigment Black 7 and ethyl cellulose: 6:4, produced by BASF, Germany) | 14.20 parts by weight |
| S-LEC BL-1 (polyvinylbutyral, dispersant, produced by Sekisui Chemical Co., Ltd.) | 2.80 parts by weight |
| HILAC 901 (ketone resin, produced by Hitachi Chemical Co., Ltd.) | 5.00 parts by weight |
| PVP K-90 (polyvinylpyrrolidone, produced by ISP Japan) | 0.40 parts by weight |
| 3-Methyl-1,5-pentanediol (polyhydric alcohol, SP value: 10.3) | 20.30 parts by weight |
| Tripropylene glycol normal-butyl ether (SP value: 8.1) | 23.10 parts by weight |
| 3-Methoxy-3-methyl-1-butanol (SP value: 9.3) | 8.00 parts by weight |
| Phenyl glycol (SP value: 11.5) | 6.30 parts by weight |

S-LEC BL-1 and all solvents in the components above were heated with stirring, and Mitsubishi Carbon #25 was added and dispersed for 1 hour by a bead mill. The obtained pigment dispersion and the remaining components were mixed under heating with stirring by a lab mixer to obtain a black ink having, at 25° C., a viscosity of 2,010,000 mPa·s at a shear rate of 0.019 s$^{-1}$, a viscosity of 807 mPa·s at a shear rate of 10,000 s$^{-1}$, a storage modulus of 255 Pa at 0.019 rad/sec, and tan δ of 0.51 at 0.019 rad/sec.

Example 3

| | |
|---|---|
| Printex G (carbon black, produced by Evonik Degussa Japan) | 19.90 parts by weight |
| MICROLITH Black C-A (a processed pigment obtainedby finely dispersing a pigment in an ethyl cellulose carrier, ratio between Pigment Black 7 and ethyl cellulose: 6:4, produced by BASF, Germany) | 14.20 parts by weight |
| S-LEC BL-1 (polyvinylbutyral, dispersant, produced by Sekisui Chemical Co., Ltd.) | 2.80 parts by weight |
| HILAC 901 (ketone resin, produced by Hitachi Chemical Co., Ltd.) | 5.00 parts by weight |
| PVP K-90 (polyvinylpyrrolidone, produced by ISP Japan) | 0.40 parts by weight |
| Hexylene glycol (polyhydric alcohol, SP value: 10.5) | 18.30 parts by weight |
| Tripropylene glycol normal-butyl ether (SP value: 8.1) | 17.10 parts by weight |
| 3-Methoxy-3-methyl-1-butanol (SP value: 9.3) | 10.00 parts by weight |
| Phenyl glycol (SP value: 11.5) | 12.30 parts by weight |

S-LEC BL-1 and all solvents in the components above were heated with stirring, and Printex G was added and dispersed for 1 hour by a bead mill. The obtained pigment dispersion and the remaining components were mixed under heating with stirring by a lab mixer to obtain a black ink having, at 25° C., a viscosity of 2,522,000 mPa·s at a shear rate of 0.019 s$^{-1}$, a viscosity of 1,536 mPa·s at a shear rate of 10,000 s$^{-1}$, a storage modulus of 184 Pa at 0.019 rad/sec, and tan δ of 0.46 at 0.019 rad/sec.

Example 4

| | |
|---|---|
| Printex 35 (carbon black, produced by Evonik Degussa Japan) | 23.70 parts by weight |
| S-LEC BL-1 (polyvinylbutyral, dispersant, produced by Sekisui Chemical Co., Ltd.) | 3.32 parts by weight |
| ETHOCEL 20 (ethyl cellulose, produced by The Dow Chemical Company) | 5.13 parts by weight |
| HILAC 901 (ketone resin, produced by Hitachi Chemical Co., Ltd.) | 5.00 parts by weight |
| PVP K-90 (polyvinylpyrrolidone, produced by ISP Japan) | 0.40 parts by weight |
| Hexylene glycol (polyhydric alcohol, SP value: 10.5) | 34.77 parts by weight |
| Tripropylene glycol normal-methyl ether (SP value: 8.7) | 15.38 parts by weight |
| Diethylene glycol monobutyl ether (SP value: 9.5) | 5.00 parts by weight |
| Phenyl glycol (SP value: 11.5) | 7.30 parts by weight |

S-LEC BL-1 and all solvents in the components above were heated with stirring, and Printex 35 was added and dispersed for 1 hour by a bead mill. The obtained pigment dispersion and the remaining components were mixed under heating with stirring by a lab mixer to obtain a black ink having, at 25° C., a viscosity of 5,358,000 mPa·s at a shear rate of 0.019 s$^{-1}$, a viscosity of 1,031 mPa·s at a shear rate of 10,000 s$^{-1}$, a storage modulus of 38 Pa at 0.019 rad/sec, and tan δ of 0.53 at 0.019 rad/sec.

Example 5

| | |
|---|---|
| FUJI Red #8800 (red pigment, Pigment Red 254, produced by Fuji Pigment Co., Ltd.) | 19.80 parts by weight |
| MICROLITH Red 2C-A (a processed pigment obtained by finely dispersing a pigment in an ethyl cellulose carrier, ratio between Pigment Red 48:2 and ethyl cellulose: 6.5:3.5, produced by BASF, Germany) | 14.20 parts by weight |
| S-LEC BL-1 (polyvinylbutyral, dispersant, produced by Sekisui Chemical Co., Ltd.) | 4.95 parts by weight |
| Synthetic Resin SK (ketone resin, produced by Evonik Degussa Japan) | 3.30 parts by weight |
| PVP K-90 (polyvinylpyrrolidone, produced by ISP Japan) | 0.40 parts by weight |
| Hexylene glycol (polyhydric alcohol, SP value: 10.5) | 21.27 parts by weight |
| 3-Methoxy-3-methyl-1-butanol (SP value: 9.3) | 36.08 parts by weight |

S-LEC BL-1 and all solvents in the components above were heated with stirring, and FUJI Red #8800 was added and dispersed for 1 hour by a bead mill. The obtained pigment dispersion and the remaining components were mixed under heating with stirring by a lab mixer to obtain a red ink having, at 25° C., a viscosity of 1,166,000 mPa·s at a shear rate of 0.019 s$^{-1}$, a viscosity of 4,780 mPa·s at a shear rate of 10,000 s$^{-1}$, a storage modulus of 103 Pa at 0.019 rad/sec, and tan δ of 0.39 at 0.019 rad/sec.

Example 6

| | |
|---|---|
| Lionol Blue E (blue pigment, Pigment Blue 15:6, produced by Toyo Ink Co., Ltd.) | 15.02 parts by weight |
| MICROLITH Blue 4G-A (a processed pigment obtained by finely dispersing a pigment in an ethyl cellulose carrier, ratio between Pigment Blue 15:3 and ethyl cellulose: 6:4, produced by BASF Germany) | 17.20 parts by weight |

-continued

| | |
|---|---|
| Solsperse 12000 (pigment derivative, produced by The Lubrizol Corporation) | 1.78 parts by weight |
| Solsperse 20000 (pigment dispersant, produced by The Lubrizol Corporation) | 7.13 parts by weight |
| Synthetic Resin SK (ketone resin, produced by Evonik Degussa Japan) | 10.56 parts by weight |
| PVP K-90 (polyvinylpyrrolidone, produced by ISP Japan) | 0.40 parts by weight |
| 3-Methyl-1,5-pentanediol (polyhydric alcohol, SP value: 10.3) | 7.13 parts by weight |
| Tripropylene glycol normal-butyl ether (SP value: 8.1) | 17.10 parts by weight |
| Phenyl glycol (SP value: 11.5) | 23.68 parts by weight |

Solsperse 12000, Solsperse 20000 and all solvents in the components above were heated with stirring, and Lionol Blue E was added and dispersed for 1 hour by a bead mill. The obtained pigment dispersion and the remaining components were mixed under heating with stirring by a lab mixer to obtain a blue ink having, at 25° C., a viscosity of 20,500,000 mPa·s at a shear rate of 0.019 s$^{-1}$, a viscosity of 3,900 mPa·s at a shear rate of 10,000 s$^{-1}$, a storage modulus of 838 Pa at 0.019 rad/sec, and tan δ of 0.28 at 0.019 rad/sec.

Example 7

| | |
|---|---|
| Printex G (carbon black, produced by Evonik Degussa Japan) | 22.90 parts by weight |
| S-LEC BL-1 (polyvinylbutyral, dispersant, produced by Sekisui Chemical Co., Ltd.) | 3.20 parts by weight |
| KLUCEL H (hydroxypropyl cellulose, produced by Sansho Co., Ltd.) | 0.50 parts by weight |
| ETHOCEL 200 (ethyl cellulose, produced by The Dow Chemical Company) | 2.00 parts by weight |
| HILAC 901 (ketone resin, produced by Hitachi Chemical Co., Ltd.) | 5.00 parts by weight |
| PVP K-90 (polyvinylpyrrolidone, produced by ISP Japan) | 0.40 parts by weight |
| Hexylene glycol (polyhydric alcohol, SP value: 10.5) | 38.40 parts by weight |
| Tripropylene glycol normal-butyl ether (SP value: 8.1) | 20.50 parts by weight |
| Phenyl glycol (SP value: 11.5) | 7.10 parts by weight |

S-LEC BL-1 and all solvents in the components above were heated with stirring, and Printex G was added and dispersed for 1 hour by a bead mill. The obtained pigment dispersion and the remaining components were mixed under heating with stirring by a lab mixer to obtain a black ink having, at 25° C., a viscosity of 1,008,750 mPa·s at a shear rate of 0.019 s$^{-1}$, a viscosity of 482 mPa·s at a shear rate of 10,000 s$^{-1}$, a storage modulus of 495 Pa at 0.019 rad/sec, and tan δ of 0.28 at 0.019 rad/sec.

Example 8

| | |
|---|---|
| Mitsubishi Carbon #25 (carbon black, produced by Mitsubishi Chemical Co., Ltd.) | 23.70 parts by weight |
| S-LEC BL-1 (polyvinylbutyral, dispersant, produced by Sekisui Chemical Co., Ltd.) | 3.32 parts by weight |
| Hyaluronic acid | 5.13 parts by weight |
| HILAC 901 (ketone resin, produced by Hitachi Chemical Co., Ltd.) | 5.00 parts by weight |
| PVP K-90 (polyvinylpyrrolidone, produced by ISP Japan) | 0.40 parts by weight |
| 3-Methyl-1,3-butanediol (polyhydric alcohol) | 24.78 parts by weight |
| Tripropylene glycol normal-methyl ether (SPvalue: 8.7) | 15.38 parts by weight |
| 3-Methoxy-3-methyl-1-butanol (SP value: 9.3) | 15.00 parts by weight |
| Benzyl glycol (SP value: 12.0) | 7.30 parts by weight |

S-LEC BL-1 and all solvents in the components above were heated with stirring, and Mitsubishi Carbon #25 was added and dispersed for 1 hour by a bead mill. The obtained pigment dispersion and the remaining components were mixed under heating with stirring by a lab mixer to obtain a black ink having, at 25° C., a viscosity of 1,248,000 mPa·s at a shear rate of 0.019 s$^{-1}$, a viscosity of 785 mPa·s at a shear rate of 10,000 s$^{-1}$, a storage modulus of 13 Pa at 0.019 rad/sec, and tan δ of 0.81 at 0.019 rad/sec.

Example 9

| | |
|---|---|
| Mitsubishi Carbon #25 (carbon black, produced by Mitsubishi Chemical Co., Ltd.) | 23.70 parts by weight |
| S-LEC BL-1 (polyvinylbutyral, dispersant, produced by Sekisui Chemical Co., Ltd.) | 3.32 parts by weight |
| Hyaluronic acid | 3.13 parts by weight |
| ETHOCEL 50 (ethyl cellulose, produced by The Dow Chemical Company) | 2.00 parts by weight |
| HILAC 901 (ketone resin, produced by Hitachi Chemical Co., Ltd.) | 5.00 parts by weight |
| PVP K-90 (polyvinylpyrrolidone, produced by ISP Japan) | 0.40 parts by weight |
| 3-Methyl-1,3-butanediol (polyhydric alcohol) | 24.78 parts by weight |
| Tripropylene glycol normal-methyl ether (SP value: 8.7) | 15.38 parts by weight |
| 3-Methoxy-3-methyl-1-butanol (SP value: 9.3) | 15.00 parts by weight |
| Benzyl glycol (SP value: 12.0) | 7.30 parts by weight |

S-LEC BL-1 and all solvents in the components above were heated with stirring, and Mitsubishi Carbon #25 was added and dispersed for 1 hour by a bead mill. The obtained pigment dispersion and the remaining components were mixed under heating with stirring by a lab mixer to obtain a black ink having, at 25° C., a viscosity of 1,018,700 mPa·s at a shear rate of 0.019 s$^{-1}$, a viscosity of 1,051 mPa·s at a shear rate of 10,000 s$^{-1}$, a storage modulus of 12 Pa at 0.019 rad/sec, and tan δ of 0.76 at 0.019 rad/sec.

Example 10

| | |
|---|---|
| Nigrosine Base EX (oil-soluble dye, produced by Orient Chemical Industries) | 18.00 parts by weight |
| Spilon Violet C-RH (oil-soluble dye, produced by Hodogaya Chemical Co., Ltd.) | 9.00 parts by weight |
| Spilon Yellow C-2GH (oil-soluble dye, produced by Hodogaya Chemical Co., Ltd.) | 4.00 parts by weight |
| ETHOCEL 20 (ethyl cellulose, produced by The Dow Chemical Company) | 5.80 parts by weight |
| HILAC 901 (ketone resin, produced by Hitachi Chemical Co., Ltd.) | 8.00 parts by weight |
| PVP K-90 (polyvinylpyrrolidone, produced by ISP Japan) | 0.40 parts by weight |
| Tripropylene glycol (polyhydric alcohol, SP value: 8.7) | 9.50 parts by weight |
| Dipropylene glycol normal-methyl ether (SP value: 8.2) | 5.30 parts by weight |
| Benzyl alcohol (SP value: 11.6) | 40.00 parts by weight |

A mixture of the components above was heated with stirring to obtain a black ink having, at 25° C., a viscosity of 1,584,000 mPa·s at a shear rate of 0.019 s$^{-1}$, a viscosity of 635 mPa·s at a shear rate of 10,000 s⁻¹, a storage modulus of 36 Pa at 0.019 rad/sec, and tan δ of 0.89 at 0.019 rad/sec.

Example 11

| | |
|---|---|
| Neo Super Blue C-555 (oil-soluble dye, produced by Chuo Synthetic Chemical Co., Ltd.) | 5.00 parts by weight |
| Spilon Red C-GH (oil-soluble dye, produced by Hodogaya Chemical Co., Ltd.) | 2.00 parts by weight |
| Oil Blue 613 (oil-soluble dye, produced by Orient Chemical Industries) | 12.00 parts by weight |
| S-LEC BL-1 (polyvinylbutyral, dispersant, produced by Sekisui Chemical Co., Ltd.) | 2.80 parts by weight |
| S-LEC BX-5 (polyvinylbutyral, dispersant, produced by Sekisui Chemical Co., Ltd.) | 0.60 parts by weight |
| HILAC 901 (ketone resin, produced by Hitachi Chemical Co., Ltd.) | 9.90 parts by weight |
| BERMOCOLL EBS481FQ (hydroxyethyl ethyl cellulose, produced by Akzo Nobel) | 10.00 parts by weight |
| Hexylene glycol (polyhydric alcohol, SP value: 10.5) | 30.30 parts by weight |
| Dipropylene glycol normal-propyl ether (SP value: 8.6) | 7.10 parts by weight |
| 3-Methyl-3-methoxy-1-butanol (SP value: 9.3) | 15.00 parts by weight |
| Phenyl glycol (SP value: 11.5) | 5.30 parts by weight |

A mixture of the components above was heated with stirring to obtain a black ink having, at 25° C., a viscosity of 1,920,500 mPa·s at a shear rate of 0.019 s⁻¹, a viscosity of 873 mPa·s at a shear rate of 10,000 s⁻¹, a storage modulus of 98 Pa at 0.019 rad/sec, and tan δ of 0.76 at 0.019 rad/sec.

Example 12

| | |
|---|---|
| Mitsubishi Carbon #25 (carbon black, produced by Mitsubishi Chemical Co., Ltd.) | 19.90 parts by weight |
| MICROLITH Black C-A (a processed pigment obtained by finely dispersing a pigment in an ethyl cellulose carrier, ratio between Pigment Black 7 and ethyl cellulose: 6:4, produced by BASF, Germany) | 14.20 parts by weight |
| Joncryl 682 (styrene acrylic resin, produced by BASF Japan) | 2.80 parts by weight |
| HILAC 901 (ketone resin, produced by Hitachi Chemical Co., Ltd.) | 5.00 parts by weight |
| PVP K-90 (polyvinylpyrrolidone, produced by ISP Japan) | 0.40 parts by weight |
| Hexylene glycol (polyhydric alcohol, SP value: 10.5) | 47.40 parts by weight |
| 3-Methoxy-3-methyl-1-butanol (SP value: 9.3) | 5.00 parts by weight |
| Benzyl alcohol (SP value: 11.6) | 5.30 parts by weight |

Joncryl 682 and all solvents in the components above were heated with stirring, and Mitsubishi Carbon #25 was added and dispersed for 1 hour by a bead mill. The obtained pigment dispersion and the remaining components were mixed under heating with stirring by a lab mixer to obtain a black ink having, at 25° C., a viscosity of 1,635,000 mPa·s at a shear rate of 0.019 s⁻¹, a viscosity of 1,950 mPa·s at a shear rate of 10,000 s⁻¹, a storage modulus of 15 Pa at 0.019 rad/sec, and tan δ of 0.51 at 0.019 rad/sec.

Example 13

A black ink having, at 25° C., a viscosity of 1,388,000 mPa·s at a shear rate of 0.019 s⁻¹, a viscosity of 1,805 mPa·s at a shear rate of 10,000 s⁻¹, a storage modulus of 108 Pa at 0.019 rad/sec, and tan δ of 0.42 at 0.019 rad/sec was obtained in the same manner except that in Example 1, the total weight of hexylene glycol (polyhydric alcohol, SP value 10.5) and phenyl glycol (SP value: 11.5) was replaced by ethylene glycol isopropyl ether (SP value: 9.2).

Example 14

| | |
|---|---|
| MICROLITH Black C-A (a processed pigment obtained by finely dispersing a pigment in an ethyl cellulose carrier, ratio between Pigment Black 7 and ethyl cellulose: 6:4, produced by BASF, Germany) | 4.20 parts by weight |
| Neo Super Blue C-555 (oil-soluble dye, produced by Chuo Synthetic Chemical Co., Ltd.) | 4.00 parts by weight |
| Spilon Red C-GH (oil-soluble dye, produced by Hodogaya Chemical Co., Ltd.) | 1.20 parts by weight |
| Valifast Yellow 1151 (oil-soluble dye, produced by Orient Chemical Industries) | 1.20 parts by weight |
| ETHOCEL 4 (ethyl cellulose, produced by The Dow Chemical Company) | 18.32 parts by weight |
| HILAC 901 (ketone resin, produced by Hitachi Chemical Co., Ltd.) | 5.00 parts by weight |
| Tripropylene glycol normal-butyl ether (SP value: 8.1) | 17.10 parts by weight |
| Benzyl alcohol (SP value: 11.6) | 38.68 parts by weight |
| Phenyl glycol (SP value: 11.5) | 10.30 parts by weight |

All of the components above were mixed under heating with stirring by a lab mixer to obtain a black ink having, at 25° C., a viscosity of 8,927,000 mPa·s at a shear rate of 0.019 s⁻¹, a viscosity of 2,770 mPa·s at a shear rate of 10,000 s⁻¹, a storage modulus of 360 Pa at 0.019 rad/sec, and tan δ of 0.60 at 0.019 rad/sec.

Example 15

| | |
|---|---|
| Mitsubishi Carbon #25 (carbon black, produced by Mitsubishi Chemical Co., Ltd.) | 19.90 parts by weight |
| ETHOCEL 200 (ethyl cellulose, produced by The Dow Chemical Company) | 1.00 parts by weight |
| HILAC 901 (ketone resin, produced by Hitachi Chemical Co., Ltd.) | 10.20 parts by weight |
| S-LEC BL-1 (polyvinylbutyral, dispersant, produced by Sekisui Chemical Co., Ltd.) | 2.80 parts by weight |
| S-LEC KS-5 (polyvinylbutyral, dispersant, produced by Sekisui Chemical Co., Ltd.) | 0.50 parts by weight |
| UNIOL D700 (polypropylene glycol, polyhydric alcohol, produced by NOF Corp.) | 15.30 parts by weight |
| Benzyl glycol (SP value: 12.0) | 30.30 parts by weight |
| Phenyl glycol (SP value: 11.5) | 20.00 parts by weight |

S-LEC BL-1 and all solvents in the components above were heated with stirring, and Mitsubishi Carbon #25 was added and dispersed for 1 hour by a bead mill. The obtained pigment dispersion and the remaining components were mixed under heating with stirring by a lab mixer to obtain a black ink having, at 25° C., a viscosity of 532,200 mPa·s at a shear rate of 0.019 s⁻¹, a viscosity of 389 mPa·s at a shear rate of 10,000 s⁻¹, a storage modulus of 10 Pa at 0.019 rad/sec, and tan δ of 0.93 at 0.019 rad/sec.

Example 16

| | |
|---|---|
| Mitsubishi Carbon #25 (carbon black, produced by Mitsubishi Chemical Co., Ltd.) | 28.42 parts by weight |
| Pemulen TR-1 (an acrylic acid•alkyl methacrylate copolymer, produced by Nikko Chemicals Co., Ltd.) | 5.68 parts by weight |

-continued

| | |
|---|---|
| S-LEC BL-1 (polyvinylbutyral, dispersant, produced by Sekisui Chemical Co., Ltd.) | 2.80 parts by weight |
| HILAC 901 (ketone resin, produced by Hitachi Chemical Co., Ltd.) | 5.00 parts by weight |
| PVP K-90 (polyvinylpyrrolidone, produced by ISP Japan) | 0.40 parts by weight |
| Hexylene glycol (polyhydric alcohol, SP value: 10.5) | 30.30 parts by weight |
| Tripropylene glycol normal-butyl ether (SP value: 8.1) | 17.10 parts by weight |
| 3-Methyl-3-methoxy-1-butanol (SP value: 9.3) | 5.00 parts by weight |
| Benzyl glycol (SP value: 12.0) | 5.30 parts by weight |

S-LEC BL-1 and all solvents in the components above were heated with stirring, and Mitsubishi Carbon #25 was added and dispersed for 1 hour by a bead mill. The obtained pigment dispersion and the remaining components were mixed under heating with stirring by a lab mixer to obtain a black ink having, at 25° C., a viscosity of 216,000 mPa·s at a shear rate of $0.019$ s$^{-1}$, a viscosity of 4,065 mPa·s at a shear rate of 10,000 s$^{-1}$, a storage modulus of 10 Pa at 0.019 rad/sec, and tan δ of 0.61 at 0.019 rad/sec.

Comparative Example 1

| | |
|---|---|
| HOSTAPERM Blue B2G-D (blue pigment, produced by Clariant Japan K.K.) | 8.52 parts by weight |
| Lionel Blue E (blue pigment, Pigment Blue 15:6, produced by Toyo Ink Co., Ltd.) | 18.02 parts by weight |
| Solsperse 12000 (pigment derivative, produced by The Lubrizol Corporation) | 1.78 parts by weight |
| Solsperse 20000 (pigment dispersant, produced by The Lubrizol Corporation) | 7.13 parts by weight |
| ETHOCEL 20 (ethyl cellulose, produced by The Dow Chemical Company) | 0.48 parts by weight |
| Synthetic Resin SK (ketone resin, produced by Evonik Degussa Japan) | 10.56 parts by weight |
| PVP K-90 (polyvinylpyrrolidone, produced by ISP Japan) | 0.40 parts by weight |
| Tripropylene glycol normal-butyl ether (SP value: 8.1) | 24.13 parts by weight |
| Phenyl glycol (SP value: 11.5) | 28.88 parts by weight |

Solsperse 12000, Solsperse 20000 and all solvents in the components above were heated with stirring, and HOSTAPERM Blue B2G-D and Lionol Blue E were added and dispersed for 1 hour by a bead mill. The obtained pigment dispersion and the remaining components were mixed under heating with stirring by a lab mixer to obtain a blue ink having, at 25° C., a viscosity of 479,520 mPa·s at a shear rate of 0.019 s$^{-1}$, a viscosity of 960 mPa·s at a shear rate of 10,000 s$^{-1}$, a storage modulus of 5 Pa at 0.019 rad/sec, and tan δ of 0.80 at 0.019 rad/sec.

Comparative Example 2

| | |
|---|---|
| Spilon Black GMH Special (oil-soluble dye, produced by Hodogaya Chemical Co., Ltd.) | 15.00 parts by weight |
| Valifast Violet 1701 (oil-soluble dye, produced by Orient Chemical Industries) | 15.00 parts by weight |
| Benzyl alcohol (SP value: 11.6) | 18.40 parts by weight |
| Phenyl glycol (SP value: 11.5) | 29.70 parts by weight |
| Kao Wax EB-G (fatty acid amide wax, produced by Kao Corporation) | 1.20 parts by weight |
| HILAC 110H (ketone resin, produced by Hitachi Chemical Co., Ltd.) | 20.20 parts by weight |
| PVP K-90 (polyvinylpyrrolidone, produced by ISP Japan) | 0.50 parts by weight |

A mixture of the components above was heated with stirring to obtain a black ink having, at 25° C., a viscosity of 78,000 mPa·s at a shear rate of 0.019 s$^{-1}$, a viscosity of 635 mPa·s at a shear rate of 10,000 s$^{-1}$, a storage modulus of 1.6 Pa at 0.019 rad/sec, and tan δ of 1.01 at 0.019 rad/sec.

Comparative Example 3

| | |
|---|---|
| Permanent Red FRR (red pigment, produced by Clariant Japan K.K.) | 15.00 parts by weight |
| Benzyl alcohol (SP value: 11.6) | 9.00 parts by weight |
| Phenyl glycol (SP value: 11.5) | 26.00 parts by weight |
| SMA 1440 (styrene-maleic acid copolymer, produced by Kawahara Petrochemical Co., Ltd.) | 6.00 parts by weight |
| SURFYNOL 104E (glycol of acetylenic hydrocarbon, dispersant, polyhydric alcohol, produced by Air Products and Chemicals, Inc.) | 0.50 parts by weight |
| KLUCEL M (hydroxypropyl cellulose, produced by Sansho Co., Ltd.) | 0.30 parts by weight |
| Sarcosinate OH (oleoyl sarcosine, produced by Nikko Chemicals Co., Ltd.) | 43.20 parts by weight |

SMA1440 and all solvents in the components above were heated with stirring, and Permanent Red FRR was added and dispersed for 1 hour by a bead mill. The obtained pigment dispersion and the remaining components were mixed under heating with stirring by a lab mixer to obtain a red ink having, at 25° C., a viscosity of 1,320 mPa·s at a shear rate of 0.019 s$^{-1}$, a viscosity of 453 mPa·s at a shear rate of 10,000 s$^{-1}$, a storage modulus of 0.4 Pa at 0.019 rad/sec, and tan δ of 1.70 at 0.019 rad/sec.

Comparative Example 4

| | |
|---|---|
| Mitsubishi Carbon #750 (carbon black, produced by Mitsubishi Chemical Co., Ltd.) | 30.00 parts by weight |
| Solsperse 20000 (pigment dispersant, produced by The Lubrizol Corporation) | 8.00 parts by weight |
| ETHOCEL 4 (ethyl cellulose, produced by The Dow Chemical Company) | 16.00 parts by weight |
| Phenyl glycol (SP value: 11.5) | 37.00 parts by weight |
| Benzyl alcohol (SP value: 11.6) | 9.00 parts by weight |

Solsperse 20000 and all solvents in the components above were heated with stirring, and Carbon Black #750 was added and dispersed for 1 hour by a bead mill. The obtained pigment dispersion and the remaining components were mixed under heating with stirring by a lab mixer to obtain a blue ink having, at 25° C., a viscosity of 8,500 mPa·s at a shear rate of 0.019 s$^{-1}$, a viscosity of 952 mPa·s at a shear rate of 10,000 s$^{-1}$, a storage modulus of 0.8 Pa at 0.019 rad/sec, and tan δ of 2.34 at 0.019 rad/sec.

Comparative Example 5

| | |
|---|---|
| Permanent Red FRR (red pigment, produced by Clariant Japan K.K.) | 15.00 parts by weight |
| Diethylene glycol (polyhydric alcohol, SP value: 9.4) | 0.50 parts by weight |
| Benzyl glycol (SP value: 12.0) | 78.20 parts by weight |
| SMA 1440 (styrene-maleic acid copolymer, produced by Kawahara Petrochemical Co., Ltd.) | 6.00 parts by weight |
| KLUCEL M (hydroxypropyl cellulose, produced by Sansho Co., Ltd.) | 0.30 parts by weight |

SMA1440 and all solvents in the components above were heated with stirring, and Permanent Red FRR was added and dispersed for 1 hour by a bead mill. The obtained pigment dispersion and the remaining components were mixed under heating with stirring by a lab mixer to obtain a red ink having, at 25° C., a viscosity of 1,850 mPa·s at a shear rate of 0.019 and a viscosity of 253 mPa·s at a shear rate of 10,000 s$^{-1}$. The tan δ at 0.019 rad/sec was 10 or more, and the storage modulus was too small to obtain stable data.

Comparative Example 6

| | |
|---|---|
| Printex G (carbon black, produced by Evonik Degussa Japan) | 19.90 parts by weight |
| MICROLITH Black C-A (a processed pigment obtained by finely dispersing a pigment in an ethyl cellulose carrier, ratio between Pigment Black 7 and ethyl cellulose: 6:4, produced by BASF, Germany) | 10.00 parts by weight |
| S-LEC BL-1 (polyvinylbutyral, dispersant, produced by Sekisui Chemical Co., Ltd.) | 2.80 parts by weight |
| S-LEC BH-3 (polyvinylbutyral, dispersant, produced by Sekisui Chemical Co., Ltd.) | 4.60 parts by weight |
| Synthetic Resin SK (ketone resin, produced by Evonik Degussa Japan) | 15.00 parts by weight |
| Hexylene glycol (polyhydric alcohol, SP value: 10.5) | 33.30 parts by weight |
| Phenyl glycol (SP value: 11.5) | 14.40 parts by weight |

S-LEC BL-1 and all solvents in the components above were heated with stirring, and Printex G was added and dispersed for 1 hour by a bead mill. The obtained pigment dispersion and the remaining components were mixed under heating with stirring by a lab mixer to obtain a black ink having, at 25° C., a viscosity of 1,630,050 mPa·s at a shear rate of 0.019 s$^{-1}$, a viscosity of 34,000 mPa·s at a shear rate of 10,000 s$^{-1}$, a storage modulus of 22 Pa at 0.019 rad/sec, and tan δ of 0.77 at 0.019 rad/sec.

Comparative Example 7

| | |
|---|---|
| Lionel Blue E (blue pigment, produced by Toyo Ink Co., Ltd.) | 21.00 parts by weight |
| MICROLITH Blue 4G-A (a processed pigment obtained by finely dispersing a pigment in an ethyl cellulose carrier, ratio between Pigment Blue 15:3 and ethyl cellulose: 6:4, produced by BASF, Germany) | 3.50 parts by weight |
| MICROLITH White R-A (a processed pigment obtained by finely dispersing a pigment in an ethyl cellulose carrier, ratio between Pigment White 6 and ethyl cellulose: 7.5:2.5, produced by BASF, Germany) | 8.00 parts by weight |
| Solsperse 12000 (pigment derivative, produced by The Lubrizol Corporation) | 1.50 parts by weight |
| Solsperse 20000 (pigment dispersant, produced by The Lubrizol Corporation) | 7.00 parts by weight |
| HILAC 110H (ketone resin, produced by Hitachi Chemical Co., Ltd.) | 12.00 parts by weight |
| PVP K-90 (polyvinylpyrrolidone, produced by ISP Japan) | 0.40 parts by weight |
| Hexylene glycol (polyhydric alcohol, SP value: 10.5) | 10.00 parts by weight |
| Phenyl glycol (SP value: 11.5) | 25.60 parts by weight |
| Benzyl alcohol (SP value: 12.0) | 11.00 parts by weight |

Solsperse 12000, Solsperse 20000 and all solvents in the components above were heated with stirring, and Lionol Blue E was added and dispersed for 1 hour by a bead mill. The obtained pigment dispersion and the remaining components were mixed under heating with stirring by a lab mixer to obtain a blue ink having, at 25° C., a viscosity of 1,580,600 mPa·s at a shear rate of 0.019 s$^{-1}$, a viscosity of 9,672 mPa·s at a shear rate of 10,000 s$^{-1}$, a storage modulus of 9 Pa at 0.019 rad/sec, and tan δ of 1.89 at 0.019 rad/sec.

Comparative Example 8

| | |
|---|---|
| Printex 35 (carbon black, produced by Evonik Degussa Japan) | 23.69 parts by weight |
| S-LEC BL-1 (polyvinylbutyral, dispersant, produced by Sekisui Chemical Co., Ltd.) | 7.32 parts by weight |
| ETHOCEL 200 (ethyl cellulose, produced by The Dow Chemical Company) | 0.93 parts by weight |
| Synthetic Resin SK (ketone resin, produced by Evonik Degussa Japan) | 9.60 parts by weight |
| PVP K-90 (polyvinylpyrrolidone, produced by ISP Japan) | 1.00 parts by weight |
| Dipropylene glycol normal-methyl ether (SP value: 8.2) | 5.38 parts by weight |
| Benzyl alcohol (SP value: 11.6) | 34.78 parts by weight |
| Phenyl glycol (SP value: 11.5) | 17.30 parts by weight |

S-LEC BL-1 and all solvents in the components above were heated with stirring, and Printex 35 was added and dispersed for 1 hour by a bead mill. The obtained pigment dispersion and the remaining components were mixed under heating with stirring by a lab mixer to obtain a black ink having, at 25° C., a viscosity of 1,587,440 mPa·s at a shear rate of 0.019 s$^{-1}$, a viscosity of 31,960 mPa·s at a shear rate of 10,000 s$^{-1}$, a storage modulus of 7 Pa at 0.019 rad/sec, and tan δ of 5.30 at 0.019 rad/sec.

Figure 2:
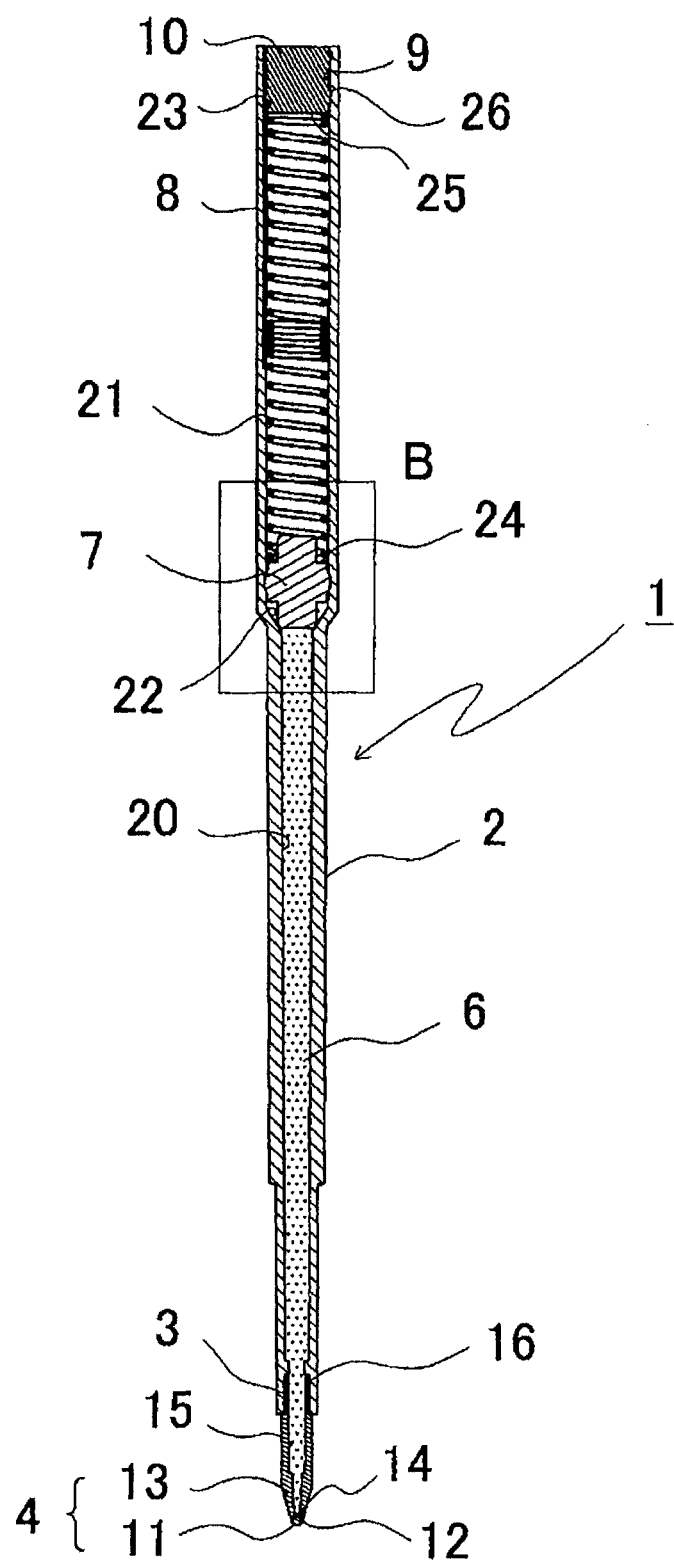
FIG. 2 A longitudinal cross-sectional view showing a working example (the state where the ink composition is entirely consumed).
Figure 3:
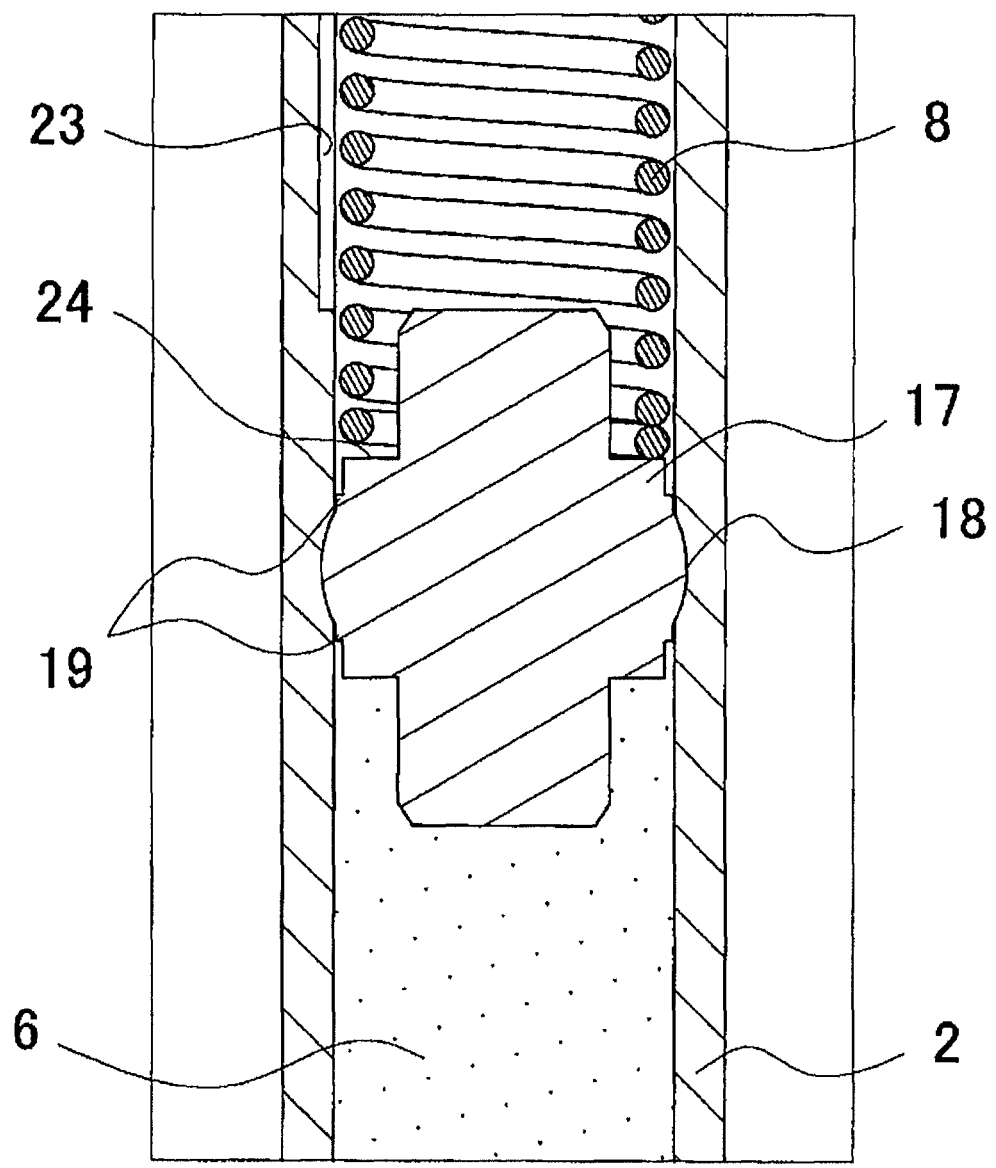
FIG. 3 An enlarged view of the part A in FIG. 1.
Figure 4:
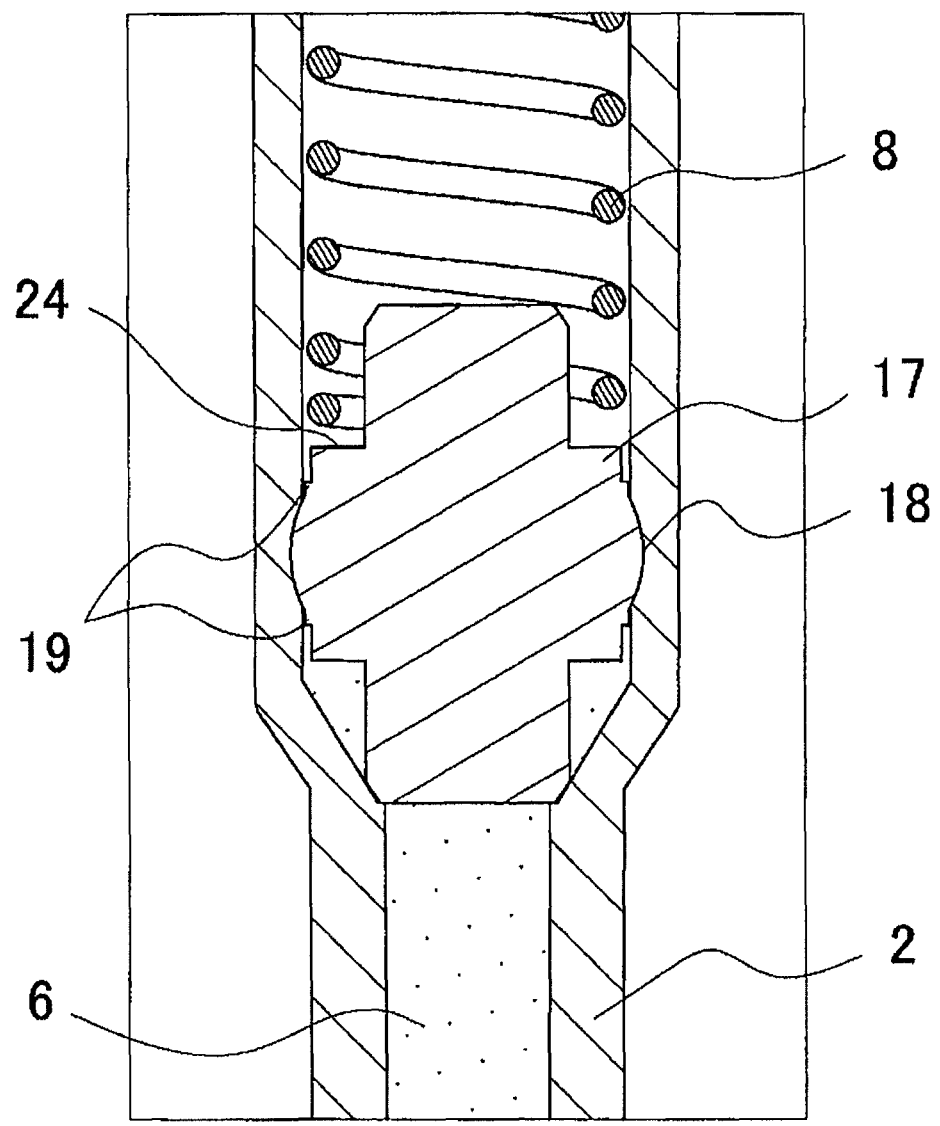
FIG. 4 An enlarged view of the part B in FIG. 2.

The same writing instrument as the commercially available oil-based ballpoint pen (ball diameter: 0.7 mm, BK70, produced by Pentel Co., Ltd., the pen nib consists of a stainless steel tip and a cemented carbide ball) was filled with 0.3 g of each of the ink compositions obtained in Examples and Comparative Examples above, and the obtained samples were devised and modified to enable writing in a state of being pressurized by a spring as shown in FIGS. 1 to 4 and evaluated after adjusting the pressurizing force to give an ink discharge amount of 0.032±0.005 g/200 m in a spiral writing tester. The writing conditions of the spiral writing tester were a writing speed of 7 cm/sec, a writing angle of 70°, and a writing load of 150 g. As for the test item, the clearness (ink depletion, blur) of writing line and the percentage change in viscosity after an accelerated test assuming long-term aging stability were evaluated.

Evaluation of Ink Depletion:

Using the ballpoint pen sample filled with each of the inks of Examples and Comparative Examples, 20 squares of about 10 mm on each side were drawn in a one-stroke fashion. A state where ink was not present, for example, near the central part of writing line or on the writing line in the turndown portion of the square character and the below-lying paper sheet was confirmed with an eye, was judged as ink depletion and the ink-depletion portions in 20 squares were counted.

Evaluation of Blur:

(1) Width of Writing Line

Spiral writing of 200 m was performed under the above-described conditions by each ballpoint pen sample filled with the ink of Examples and Comparative Examples. The writing line obtained by spiral writing was left standing for 1 hour in a room-temperature environment. After fully drying the writing line, the width of writing line in the region of 100 to 200 m was measured at 10 random points, and the average value of the width of writing line was calculated.

(2) Unevenness or Feathering

After fully drying the writing line obtained by spiral writing performed under the above-described conditions by using each ballpoint pen sample filled with the ink of Examples and Comparative Examples, the boundary between the writing line and the paper sheet was observed through a microscope at a magnification of 200 times. At this time, with respect to the unevenness or feathering extended transversely by 0.01 mm or more than the average value of the width of writing line, the number of blurs per 5 cm of the written line was confirmed with an eye.

Percentage Change in Viscosity of Ink

The ballpoint pen sample filled with each ink of Examples and Comparative Examples was stored at an ambient temperature of 80° C. and a humidity of 80% for 2 weeks while leaving the pen nib projected. Thereafter, the ink in the refill was extracted and measured for the viscosity at a shear rate of $0.019\ s^{-1}$. The percentage change in viscosity after storage at an ambient temperature of 80° C. and a humidity of 80% for 2 weeks based on the viscosity immediately after the preparation of ink was calculated.

TABLE 1

| | | Clearness of Writing line | | Aging Stability |
|---|---|---|---|---|
| | | | Blur | Percentage |
| | | Width | Unevenness | Change in |
| | Ink | of Writing | or | Viscosity |
| | Depletion | Line | Feathering | of Ink |
| | (portions) | (mm) | (pieces) | (%) |
| Example 1 | 0 | 0.21 | 0 | 3 |
| 2 | 0 | 0.21 | 0 | 3 |
| 3 | 0 | 0.21 | 0 | 6 |
| 4 | 0 | 0.21 | 0 | 8 |
| 5 | 1 | 0.20 | 0 | 4 |
| 6 | 1 | 0.20 | 0 | 18 |
| 7 | 0 | 0.22 | 2 | 7 |
| 8 | 0 | 0.22 | 2 | 15 |
| 9 | 0 | 0.22 | 4 | 22 |
| 10 | 0 | 0.22 | 4 | 22 |
| 11 | 2 | 0.21 | 0 | 35 |
| 12 | 0 | 0.22 | 0 | 33 |
| 13 | 3 | 0.23 | 0 | 26 |
| 14 | 2 | 0.21 | 0 | 36 |
| 15 | 0 | 0.23 | 6 | 17 |
| 16 | 3 | 0.23 | 6 | 27 |
| Comparative Example 1 | 0 | 0.24 | 15 | 8 |
| 2 | 12 | 0.24 | 28 | 45 |
| 3 | 0 | 0.26 | 50 | 31 |
| 4 | 0 | 0.26 | 32 | 5 |
| 5 | 0 | 0.27 | 61 | 13 |
| 6 | 55 | 0.23 | 0 | 23 |
| 7 | 5 | 0.23 | 18 | 17 |
| 8 | 42 | 0.24 | 2 | 3 |

In Examples 1 to 16 where the ink composition for a ballpoint pen had a viscosity of 200,000 mPa·s or more at a shear rate of $0.019\ s^{-1}$, a viscosity of 5,000 mPa·s or less at a shear rate of $10,000\ s^{-1}$, and a storage modulus of 10 Pa or more at an angular frequency of 0.019 rad/sec, the viscosity of the ink was reduced by a shear force attributable to rotation of a ball during writing, making it possible to obtain high flowability of the ink and cause no ink depletion, and since the ink is likely to return to a high-viscosity state of the standing still state concurrently with passing of the ball on the writing line, the ink did not flow any more to a paper space absent of writing line from the writing line portion defined at the moment of transfer and did not move by keeping the form of the ink put on paper or the like, as a result, blurless clear writing line with a thin width of writing line was obtained.

In Examples 1 to 14 where the ink composition for a ballpoint pen had a viscosity of 200,000 mPa·s or more at a shear rate of $0.019\ s^{-1}$, a viscosity of 5,000 mPa·s or less at a shear rate of $10,000\ s^{-1}$, a storage modulus of 10 Pa or more at an angular frequency of 0.019 rad/sec, and tan δ of less than 1.0 at an angular frequency of 0.019 rad/sec, the ink could always keep the state of 200,000 mPa·s or more even under a small stress due to the gravity continuously applied to the ink on writing line until drying and not only the ink was prevented for thickening of the width of writing line was without spreading any more to a paper space absent of writing line from the writing line portion defined at the moment of transfer but also the ink put on a paper sheet or the like did not move and could remain exactly in that form, as a result, blurless clear writing line having a thinner width of writing line was obtained.

In particular, the oil-based ink composition for a ballpoint pen in Examples 1 to 11 was an oil-based ink composition for a ballpoint pen having a viscosity of 200,000 mPa·s or more at a shear rate of $0.019\ s^{-1}$, a viscosity of 5,000 mPa·s or less at a shear rate of $10,000\ s^{-1}$, a storage modulus of 10 Pa or more at an angular frequency of 0.019 rad/sec, and tan δ of less than 1.0 at an angular frequency of 0.019 rad/sec, and containing a cellulose derivative and/or a mucopolysaccharide, a polyhydric alcohol solvent and an organic solvent with a solubility parameter (SP value) of 8.0 to 9.5, and therefore, could easily obtain good viscosity characteristics and achieve good dissolution of a shear viscosity reduction-imparting resin, so that blurless clear writing line free from ink depletion could be obtained and an oil-based ink composition for a ballpoint pen reduced in the percentage change in viscosity with aging could be obtained.

On the other hand, in Comparative Examples 1 to 8 where the ink composition for a ballpoint pen had a viscosity of less than 200,000 mPa·s at a shear rate of $0.019\ s^{-1}$, the ink was in a liquid state during standing still and in turn, the ink on the writing line was also in the state of having flowability, as a result, blur was not prevented from occurring.

Also, in Comparative Examples 6 to 8 where the ink composition for a ballpoint pen had a viscosity of more than 5,000 mPa·s at a shear rate of $10,000\ s^{-1}$, the ink during writing was lacking flowability and therefore, ink depletion was caused.

While the invention has been described in detail and with reference to specific embodiments thereof, it will be apparent to one skilled in the art that various changes and modifications can be made therein without departing from the spirit and scope of the invention.

This application is based on Japanese Patent Application (Patent Application No. 2011-189491) filed on Aug. 31, 2011, the contents of which are incorporated herein by way of reference.

INDUSTRIAL APPLICABILITY

As described in detail in the foregoing pages, the oil-based ink for a ballpoint pen of the present invention ensures writing line where the width of writing line is thin, even slight unevenness or feathering does not occur at the boundary between the writing line and a paper sheet, ink-depleted writing line that is writing line in a state of ink being lacked near the central part of writing line is prevented, and the writing line is clear.

DESCRIPTION OF REFERENCE NUMERALS AND SIGNS

1: Writing instrument body
2: Shaft tube

3: Front end
4: Ballpoint pen tip
5: Ink composition
6: Liquid grease
7: Sliding plug
8: Coil spring
9: Rear end opening
10: End closer
11: Ball
12: Front end opening
13: Ball holder
14: Inward projection
15: Inner hole
16: Press-fit part
17: Cylinder part
18: Annular projection
19: Step part
20: Small diameter part
21: Large diameter part
22: Connection part
23: Thin groove
24: Rear surface
25: Front surface
26: Press-fit part

The invention claimed is:

1. An oil-based ink composition for a ballpoint pen, wherein the ink viscosity at 25° C. is 200,000 mPa·s or more at a shear rate of 0.019 $s^{-1}$ and 5,000 mPa·s or less at a shear rate of 10,000 $s^{-1}$ and the storage modulus at an angular frequency of 0.019 rad/sec is 10 Pa or more.

2. The oil-based ink composition for a ballpoint pen according to claim 1, wherein tan δ at an angular frequency of 0.019 rad/sec is less than 1.0.

3. The oil-based ink composition for a ballpoint pen according to claim 1, comprising at least a colorant, one member or a mixture of two or more members selected from a cellulose derivative and/or a mucopolysaccharide, a polyhydric alcohol solvent, and an organic solvent having a solublity parameter (SP value) of 8.0 to 9.5.

4. The oil-based ink composition for a ballpoint pen according to claim 3, wherein said colorant contains at least a pigment.

5. The oil-based ink composition for a ballpoint pen according to claim 3, wherein said cellulose derivative is ethyl cellulose.

6. A pressurized ballpoint pen filled with the ink described in claim 1.

* * * * *